(12) United States Patent
Toupet et al.

(10) Patent No.: US 12,073,427 B2
(45) Date of Patent: Aug. 27, 2024

(54) METHODS AND APPARATUS TO CORRECT MISATTRIBUTIONS OF MEDIA IMPRESSIONS

(71) Applicant: The Nielsen Company (US), LLC, New York, NY (US)

(72) Inventors: Antonia Toupet, Sunnyvale, CA (US); Albert R. Perez, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/191,479

(22) Filed: Mar. 3, 2021

(65) Prior Publication Data

US 2021/0192565 A1    Jun. 24, 2021

Related U.S. Application Data

(63) Continuation of application No. 16/146,912, filed on Sep. 28, 2018, now Pat. No. 10,963,907, which is a (Continued)

(51) Int. Cl.
*G06Q 30/0242* (2023.01)
*G06Q 30/0251* (2023.01)

(52) U.S. Cl.
CPC ..... *G06Q 30/0244* (2013.01); *G06Q 30/0251* (2013.01)

(58) Field of Classification Search
CPC combination set(s) only.
See application file for complete search history.

(56) References Cited

U.S. PATENT DOCUMENTS 3,406,516 A    10/1968 Yates
5,584,050 A    12/1996 Lyons
(Continued)

FOREIGN PATENT DOCUMENTS

AU    2013205736    5/2013
CA    2757278 A1 * 10/2010 ............. G06Q 30/02
(Continued)

OTHER PUBLICATIONS

Taboga, Marco, "Linear combinations of normal random variables," from "Lectures on probability and statistics," (2010) <http://www.statlect.com/normal_distribution_linearcombinations.htm> (4 pages).
(Continued)

*Primary Examiner* — Marie P Brady

(57) ABSTRACT

An example apparatus includes an impression collector to receive, at a first internet domain, a first request from a client device, the first request indicative of access to media at the client device; and send, from the first internet domain, a response to the client device, the response to instruct the client device to send a second request to a second internet domain; an audience adjustment factor determiner to determine an audience adjustment factor for a demographic group based on first impressions reported by the client device to the first internet domain and second impressions reported by the client device to the second internet domain; and a unique audience corrector to determine a misattribution-corrected unique audience size for the demographic group based on the audience adjustment factor and based on a second unique audience size determined at the second internet domain for the demographic group.

20 Claims, 7 Drawing Sheets

Related U.S. Application Data continuation of application No. 14/528,495, filed on Oct. 30, 2014, now abandoned.

(60) Provisional application No. 61/923,959, filed on Jan. 6, 2014.

(56) References Cited

U.S. PATENT DOCUMENTS

| | | |
|---|---|---|
| 5,594,934 A | 1/1997 | Lu et al. |
| 5,675,510 A | 10/1997 | Coffey et al. |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Feliciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,627,291 B1 | 12/2009 | James-Roxby et al. |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,569 B2 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 7,979,544 B2 * | 7/2011 | Cancel .................. G06Q 30/02 709/224 |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,514,907 B2 | 8/2013 | Wright et al. |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,874,652 B1 * | 10/2014 | Pecjak .................. G06Q 30/02 709/224 |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,083,853 B2 | 7/2015 | Shkedi |
| 9,117,217 B2 | 8/2015 | Wilson et al. |
| 9,215,288 B2 | 12/2015 | Seth et al. |
| 9,237,138 B2 | 1/2016 | Bosworth et al. |
| 9,269,049 B2 | 2/2016 | McCann et al. |
| 9,301,007 B2 | 3/2016 | Ramaswamy |
| 9,380,122 B1 | 6/2016 | Pecjak et al. |
| 9,430,746 B2 | 8/2016 | Pecjak et al. |
| 9,438,939 B2 | 9/2016 | Wright et al. |
| 9,519,914 B2 | 12/2016 | Splaine et al. |
| 9,948,530 B1 | 4/2018 | Niederstrasser et al. |
| 10,147,114 B2 | 12/2018 | Toupet et al. |
| 10,368,130 B2 | 7/2019 | Nagaraja Rao et al. |
| 10,380,633 B2 | 8/2019 | Morovati et al. |
| 10,699,286 B2 | 6/2020 | Shah et al. |
| 10,963,907 B2 | 3/2021 | Toupet et al. |
| 11,068,927 B2 | 7/2021 | Toupet et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |

(56) References Cited

U.S. PATENT DOCUMENTS

| | | |
|---|---|---|
| 2005/0166233 A1 | 7/2005 | Beyda et al. |
| 2005/0223093 A1 | 10/2005 | Hanson et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0025024 A1 | 1/2009 | Beser et al. |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0293001 A1 | 11/2009 | Lu et al. |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0088152 A1 | 4/2010 | Bennett |
| 2010/0088373 A1 | 4/2010 | Pinkham |
| 2010/0070621 A1 | 5/2010 | Urdan et al. |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1* | 10/2011 | Pugh ........................ H04L 67/01 709/224 |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1* | 3/2012 | Perez ................... G06Q 10/067 707/810 |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0143713 A1 | 7/2012 | Dittus et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1* | 9/2012 | Mazumdar ......... G06Q 30/0246 709/224 |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0058836 A1 | 2/2014 | Wiseman et al. |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0279074 A1 | 9/2014 | Chen et al. |
| 2014/0280891 A1 | 9/2014 | Doe |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0186403 A1 | 7/2015 | Srivastava et al. |
| 2015/0189500 A1 | 7/2015 | Bosworth et al. |
| 2015/0193813 A1 | 7/2015 | Toupet et al. |

(56) References Cited

U.S. PATENT DOCUMENTS

| | | | |
|---|---|---|---|
| 2015/0193816 A1 | 7/2015 | Toupet et al. | |
| 2015/0262207 A1 | 9/2015 | Rao et al. | |
| 2015/0278858 A1 | 10/2015 | Lyons et al. | |
| 2015/0324837 A1* | 11/2015 | Shimizu | G06Q 30/0242 705/14.43 |
| 2017/0091794 A1 | 3/2017 | Sheppard et al. | |
| 2019/0034962 A1 | 1/2019 | Toupet et al. | |
| 2019/0087853 A1 | 3/2019 | Toupet et al. | |
| 2020/0273049 A1 | 8/2020 | Pugh et al. | |
| 2021/0342880 A1 | 11/2021 | Toupet et al. | |

FOREIGN PATENT DOCUMENTS

| | | |
|---|---|---|
| CN | 1898662 | 1/2007 |
| CN | 101222348 | 7/2008 |
| CN | 101505247 | 8/2009 |
| GB | 2176639 | 12/1986 |
| JP | H07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20100094021 | 8/2010 |
| KR | 20110023293 | 3/2011 |
| WO | WO9617467 | 6/1996 |
| WO | WO9628904 | 9/1996 |
| WO | WO9641495 | 12/1996 |
| WO | WO2000041115 | 7/2000 |
| WO | WO200207054 | 1/2002 |
| WO | WO2003027860 | 4/2003 |
| WO | WO2005013072 | 2/2005 |
| WO | WO2005024689 | 3/2005 |
| WO | WO2008150575 | 12/2008 |
| WO | WO2010088372 | 8/2010 |
| WO | WO2010104285 | 9/2010 |
| WO | WO200152168 | 7/2011 |
| WO | WO2011097624 | 8/2011 |
| WO | WO2012019643 | 2/2012 |
| WO | WO2012040371 | 3/2012 |
| WO | WO2012087954 | 6/2012 |
| WO | WO2012128895 | 9/2012 |
| WO | WO2012170902 | 12/2012 |
| WO | WO2012177866 | 12/2012 |
| WO | WO2013122907 | 8/2013 |
| WO | WO2013188429 | 12/2013 |
| WO | WO2014059319 | 4/2014 |
| WO | WO2014176343 | 10/2014 |
| WO | WO2014179218 | 11/2014 |
| WO | WO2014182764 | 11/2014 |
| WO | WO2015005957 | 1/2015 |
| WO | WO2015023589 | 2/2015 |
| WO | WO2015102795 | 7/2015 |
| WO | WO2015102796 | 7/2015 |
| WO | WO2015102803 | 7/2015 |

OTHER PUBLICATIONS

Goerg et al., "How Many Millenials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.
Patent Cooperation Treaty, "International Search Report," issued by the International Searching Authority in connection with PCT Application No. PCT/US2014/068165, mailed on Feb. 25, 2015, 3 pages.
Patent Cooperation Treaty, "Written Opinion of the International Searching Authority," issued by the International Searching Authority in connection with PCT Application No. PCT/US2014/068165, mailed on Feb. 25, 2015, 5 pages.
Patent Cooperation Treaty, "International Preliminary Report on Patentability," issued by the International Searching Authority in connection with PCT Application No. PCT/US2014/068165, mailed Jul. 12, 2016, 1 page.
Braverman, Samantha, "Are the Online Marketing Efforts of TV Shows and Programs Worthwhile?" Harris Interactive, Mar. 30, 2011, 5 pages.
Danaher, Peter J., Journal of Marketing Research, vol. XXVIII, "A Canonical Expansion Model for Multivariate Media Exposure Distributions: A Generalization of the 'Duplication of Viewing Law," Aug. 1991 (7 pages).
Enoch, Glenn. and Johnson, Kelly. Journal of Advertising Research, "Cracking the Cross-Media Code: How to Use Single-Source Measures to Examine Media Cannibalization and Convergence," Jun. 2010 (13 pages).
Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).
Huang, Chun-Yao and Lin Chen-Shun, Journal of Advertising Research, vol. 35, No. 2, "Modeling the Audience's Banner Ad Exposure For Internet Advertising Planning," Summer 2006 (15 pages).
Nielsen, "How Teens Use Media: A Nielsen Report on the Myths and Realities of Teen Media Trends," J2EE 09 (17 pages).
Arbitron Inc., Edison Research, "The Infinite Dial 2011: Navigating Digital Platforms," 2011 (83 pages).
Rust, Roland T., Klompmaker, Jay E., Journal for Advertising, vol. 10, No. 3, "A Comparative Study of Television Duplication Models," 1981 (6 pages).
Edwards, Jim, "Apple Wants More Advertisers To Use Its iPhone Tracking System," Business Insider, Jun. 13, 2013, Retrieved from <http://www.businessinsider.com/apples-idfa-and-ifa-tracking-system-2013-6> on Jul. 24, 2014, 2 pages.
Facebook for Business, "Measuring Conversions on Facebook, Across Devices and in Mobile Apps,"Aug. 14, 2014, Retrieved from <https://www.facebook.com/business/news/cross-device-measurement> on Aug. 14, 2014, 3 pages.
Adam et al., "Privacy Preserving Integration of Health Care Data," AMIA 2007 Symposium Proceedings, 6 pages.
Chloe Albanesius, "Facebook Issues Fix for Several Tracking Cookies," internet article, www.pcmag.com, Sep. 28, 2011, 2 pages.
Emil Protalinski, "Facebook denies cookie tracking allegations," internet article, www.zdnet.com, Sep. 25, 2011, 2 pages.
Emil Protalinski, "Facebook fixes cookie behavior after logging out," internet article, www.zdnet.com, Sep. 27, 2011, 2 pages.
Emil Protalinski, "US congressmen ask FTC to investigate Facebook cookies," internet article, www.zdnet.com, Sep. 28, 2011, 2 pages.
Fliptop, "Fliptop Person API Documentation," https://developer.fliptop.com/documentation, retrieved on May 7, 2013 (6 pages).
Fliptop, "Get, Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
JavaScript and AJAX Forum, Sep. 28, 2005, [retrieved from Internet at http://www.webmasterworld.com/ forum91/4465.htm on Jun. 29, 2011] 4 pages.
Launder, "Media Journal: Nielsen to Test Online-TV Viewing Tool," The Wall Street Journal, Apr. 30, 2013, 2 pages.
Mental Poker, Wikipedia, Jan. 12, 2010, [retrieved from Internet at http://en.wikipedia.org/wiki/Mental_poker on Sep. 21, 2010] 5 pages.
Nielsen Unveils New Online Advertising Measurement, The Nielsen Company, Sep. 27, 2010, [retrieved from Internet at http://nielsen.com/us/en/insights/pressroom/2010/nielsen_unveils_newonlineadvertisingmeasurement.html on May 31, 2012] 3 pages.
Nik Cubrilovic, "Logging out of Facebook is not enough," internet article, www.nikcub.appspot.com, Sep. 25, 2011, 3 pages.
Rapleaf, "Fast. Simple. Secure," www.rapleaf.com/why-rapleaf/, retrieved on May 7, 2013 (3 pages).

(56) References Cited

OTHER PUBLICATIONS

Rapleaf, "Frequently Asked Questions," www.rapleaf.com/about-us/faq/#where, retrieved on May 7, 2013 (3 pages).
Rapleaf, "The Consumer Data Marketplace," www.rapleaf.com/under-the-hood/, retrieved on May 7, 2013 (2 pages).
Sharma, "Nielsen Gets Digital to Track Online TV Viewers," All Things, Apr. 30, 2013, 3 pages.
Steve Coffey, "Internet Audience Measurement: A Practitioner's View," Journal of Interactive Advertising, vol. 1, No. 2, Spring 2001, 8 pages.
Vega, Tanzina, "Nielsen Introduces New Ad Measurement Product," The New York Times, Sep. 27, 2010 (7 pages).
Vranica, "Nielsen Testing a New Web-Ad Metric," The Wall Street Journal, Sep. 23, 2010, 2 pages.
Hothorn et al. "Unbiased Recursive Partitioning: A Conditional Inference Framework," Journal of Computational and Geographical Statistics, vol. 15, No. 3, 2006, pp. 651-674 (21 pages).
Patent Cooperation Treaty, "International Search Report," issued by the International Searching Authority in connection with PCT Application No. PCT/US2014/068168, mailed on Mar. 2, 2015, 3 pages.
Patent Cooperation Treaty, "Written Opinion of the International Searching Authority," issued by the International Searching Authority in connection with PCT Application No. PCT/US2014/068168, mailed on Mar. 2, 2015, 5 pages.
Patent Cooperation Treaty, "International Preliminary Report on Patentability," issued by the International Bureau in connection with PCT Application No. PCT/US2014/068168, mailed Jul. 12, 2015, 1 page.
United States Patent and Trademark Office, "Non-final Office Action," issued in connection with U.S. Appl. No. 14/502,409, on Nov. 16, 2016, 22 pages.
Pouttu-Clarke, Matt, "J2EE patterns: Cross Domain Cookie Provider," The Server Side, Jan. 19, 2005, 9 pages. <http://www.theserverside.com/discussions/thread/31258.html>.
United States Patent and Trademark Office, "Final Office Action," issued Mar. 29, 2018 in connection with U.S. Appl. No. 14/528,495, 40 pages.
United States Patent and Trademark Office, "Advisory Action," issued Jul. 23, 2018 in connection with U.S. Appl. No. 14/528,495, 3 pages.
United States Patent and Trademark Office, "Notice of Panel Decision from Pre-Appeal Brief Review," issued Aug. 13, 2018 in connection with U.S. Appl. No. 14/528,495, 2 pages.
United States Patent and Trademark Office, "Notice of Abandonment," issued Apr. 8, 2019 in connection with U.S. Appl. No. 14/528,495, 2 pages.
United States Patent and Trademark Office, "Notice of Allowance," issued Jul. 20, 2018 in connection with U.S. Appl. No. 14/502,409, 15 pages.
Interactive Advertising Bureau, "Interactive Audience Measuring and Advertising Campaign Reporting and Audit Guidelines," Sep. 2004, Version 6.0b, 20 pages.
United States Patent and Trademark Office, "Non-Final Office Action," issued Aug. 24, 2020 in connection with U.S. Appl. No. 16/196,481, 19 pages.

Jeffries-Fox, "A Primer in Internet Audience Measurement," Digital PR Guidebook, pp. 178-184, Rockville: Access Intelligence LLC, 2007.
Bernstein et al., "Quantifying the Invisible Audience in Social Networks," CHI 2013: Changing Perspectives, Apr. 27-May 2, 2013, Paris, France, 10 pages.
United States Patent and Trademark Office, "Non-final Office Action," issued in connection with U.S. Appl. No. 14/528,495, on Nov. 28, 2016, 34 pages.
United States Patent and Trademark Office, "Final Office Action," issued in connection with U.S. Appl. No. 14/528,495, on Mar. 23, 2017, 49 pages.
United States Patent and Trademark Office, "Non-final Office Action," issued in connection with U.S. Appl. No. 14/528,495, on Oct. 6, 2017, 34 pages.
United States Patent and Trademark Office, "Non-Final Office Action," issued in connection with U.S. Appl. No. 16/146,912, mailed on May 18, 2020, 20 pages.
United States Patent and Trademak Office, "Notice of Allowance and Fee(s) Due," issued in connection with U.S. Appl. No. 16/146,912, mailed on Nov. 18, 2020, 10 pages.
United States Patent and Trademark Office, "Notice of Allowance and fee(s) Due," issued Mar. 15, 2021 in connection with U.S. Appl. No. 16/196,481, 19 pages.
United States Patent and Trademark Office, "Non-Final Office Action," issued Jul. 22, 2022 in connection with U.S. Appl. No. 17/378,463, 20 pages.
Koehler et al., "A Method for Measuring Online Audiences," Google Inc. (2013), pp. 1-24, <https://research.google/pubs/pub41089/> 2013, 25 pages.
Liu et al., "Broadcast Audience Estimation," 2000 IEEE InfoCom 2000, p. 952-960, 9 pages.
Nekovee et al., "An Adaptive Method for Dynamic Audience Size Estimation in Multicast," B. Stiller et al. (Eds.), NGC/ICQT 2003, LNCs 2816, pp. 23-33, 2003, 11 pages.
United States Patent and Trademark Office, "Notice of Allowability," issued in connection with U.S. Appl. No. 16/146,912, dated Dec. 24, 2020, 2 pages.
United States Patent and Trademark Office, "Final Office Action," issued in connection with U.S. Appl. No. 14/502,409, on Mar. 9, 2017, 17 pages.
United States Patent and Trademark Office, "Advisory Action," issued in connection with U.S. Appl. No. 14/502,409, on March May 17, 2017, 5 pages.
United States Patent and Trademark Office, "Non-final Office Action," issued in connection with U.S. Appl. No. 14/502,409, on Jun. 20, 2017, 13 pages.
United States Patent and Trademark Office, "Final Office Action," issued in connection with U.S. Appl. No. 17/378,463, filed Dec. 28, 2022, 25 pages.
Tutorialspoint, "Microprocessor—Overview," retrieved from <https://www.tutorialspoint.com/microprocessor/microprocessor_overview.htm> on Nov. 22, 2022, 2 pages.
United States Patent and Trademark Office, "Notice of Allowance," issued Mar. 23, 2023 in connection with U.S. Appl. No. 17/378,463, 9 pages.

\* cited by examiner

FIG. 3

Development impressions of media (i) for AME panelists that are also database proprietor subscribers Table 300:

| IMP # | AME ID | GENDER | AGE | DP ID | GENDER | AGE |
|---|---|---|---|---|---|---|
| 1 | 1 | M | 24 | 1 | M | 24 |
| 2 | 1 | M | 24 | 1 | M | 24 |
| 3 | 2 | F | 25 | 2 | F | 25 |
| 4 | 2 | F | 25 | 2 | F | 25 |
| 5 | 3 | F | 60 | 3 | F | 60 |
| 6 | 4 | M | 61 | 4 | M | 61 |
| 7 | 5 | F | 21 | 5 | F | 21 |
| 8 | 6 | M | 30 | 6 | M | 30 |
| 9 | 7 | F | 29 | 6 | M | 30 |

302 — AME IMPRESSIONS (TRUTH)
304 — DATABASE PROPRIETOR (DP) IMP
308 — MISATTRIBUTION ERROR

FIG. 4

Audience Adjustment (AA) factors for Unique Audience (UA) by Demographic (DEMO) group (j) for media (i)

Table 400:

| DEMO GROUP (j) | AME UA (TRUTH) ($T_{i,j}$) | DP UA ($F_{i,j}$) | AA FACTORS ($f_{i,j} = F_{i,j} / T_{i,j}$) |
|---|---|---|---|
| F < 50 | 3 | 2 | 0.67 |
| F >= 50 | 1 | 1 | 1.00 |
| M < 50 | 2 | 2 | 1.00 |
| M >= 50 | 1 | 1 | 1.00 |
| TOTAL | 7 | 6 | |

FIG. 5

| DEMOGRAPHIC (DEMO) GROUP ($i$) | AME IMPRESSIONS (TRUTH) ($Q_{ij}$) | DP IMPRESSIONS ($R_{ij}$) | AME (TRUE) DISTRIBUTION | DP DISTRIBUTION | IA FACTORS ($k_{ij}$) |
|---|---|---|---|---|---|
| F<50 | 4 | 3 | 44% | 33% | 11.11% |
| F>=50 | 1 | 1 | 11% | 11% | 0.00% |
| M<50 | 3 | 4 | 33% | 44% | -11.11% |
| M>=50 | 1 | 1 | 11% | 11% | 0.00% |

IMPRESSIONS ADJUSTMENT (IA) FACTORS FOR TOTAL IMPRESSIONS BY DEMOGRAPHIC (DEMO) GROUP

FIG. 6

| DEMOGRAPHIC (DEMO) GROUP | DP DT-CORRECTED DATA | | AA FACTORS ($f_{ij}$) | IA FACTORS ($k_{ij}$) | DP ADJUSTED DATA | |
|---|---|---|---|---|---|---|
| | UA | IMP | | | MISATTRIBUTION-CORRECTED UA | MISATTRIBUTION-CORRECTED IMP |
| F<50 | 63,000 | 210,000 | 0.67 | 11.11% | 94,500 | 288,889 |
| F>=50 | 57,000 | 190,000 | 1.00 | 0.00% | 57,000 | 190,000 |
| M<50 | 49,000 | 165,000 | 1.00 | -11.11% | 49,000 | 86,111 |
| M>=50 | 43,000 | 145,000 | 1.00 | 0.00% | 43,000 | 145,000 |
| TOTAL | 212,000 | 710,000 | | | 243,500 | 710,000 |

MISATTRIBUTION-CORRECTED DATA

| DEMOGRAPHIC (DEMO) GROUP | DP DT-CORRECTED DATA ||| IA FACTORS ($k_{i,j}$) | DP ADJUSTED DATA ||
|---|---|---|---|---|---|---|
| | UA | IMP | FREQ | | MISATTRIBUTION-CORRECTED UA | MISATTRIBUTION-CORRECTED IMP |
| F<50 | 63,000 | 210,000 | 3.3 | 11.11% | 86,667 | 288,889 |
| F>=50 | 57,000 | 190,000 | 3.3 | 0.00% | 57,000 | 190,000 |
| M<50 | 49,000 | 165,000 | 3.4 | -11.11% | 25,572 | 86,111 |
| M>=50 | 43,000 | 145,000 | 3.5 | 0.00% | 43,000 | 145,000 |
| TOTAL | 212,000 | 710,000 | | | 212,239 | 710,000 |

MISATTRIBUTION-CORRECTED DATA
FIG. 7

METHODS AND APPARATUS TO CORRECT MISATTRIBUTIONS OF MEDIA IMPRESSIONS

CROSS-REFERENCE TO RELATED APPLICATIONS

This application is a continuation of U.S. patent application Ser. No. 16/146,912, now U.S. Pat. No. 10,963,907, filed on Sep. 28, 2018, which is a continuation of U.S. patent application Ser. No. 14/528,495, filed Oct. 30, 2014, which claims the benefit of, and priority from, U.S. Provisional Patent Application Ser. No. 61/923,959 filed on Jan. 6, 2014, all of which are hereby incorporated herein by reference in their entireties.

FIELD OF THE DISCLOSURE

The present disclosure relates generally to monitoring media and, more particularly, to methods and apparatus to correct misattributions of media impressions.

BACKGROUND

Traditionally, audience measurement entities determine audience engagement levels for media based on registered panel members. That is, an audience measurement entity enrolls people who consent to being monitored into a panel. The audience measurement entity then monitors those panel members to determine media (e.g., television programs or radio programs, movies, DVDs, advertisements, streaming media, websites, etc.) exposed to those panel members. In this manner, the audience measurement entity can determine exposure metrics for different media based on the collected media measurement data.

Techniques for monitoring user access to Internet resources such as web pages, advertisements and/or other Internet-accessible media have evolved significantly over the years. Some known systems perform such monitoring primarily through server logs. In particular, entities serving media on the Internet can use known techniques to log the number of requests received for their media (e.g., content and/or advertisements) at their server.

BRIEF DESCRIPTION OF THE DRAWINGS

FIG. 3 illustrates example impressions collected by the AME and example impressions collected by the DP with a misattribution error.

FIG. 4 illustrates example audience adjustment (AA) factors for unique audience sizes of different demographic groups determined based on the example impressions of FIG. 3.

FIG. 5 illustrates example impression adjustment (IA) factors for total impressions of different demographic groups determined based on the example impressions of FIG. 3.

FIG. 6 illustrates example misattribution-corrected unique audience values and example misattribution-corrected impression counts determined based on the example AA factors of FIG. 4 and the example IA factors of FIG. 5 for different demographic groups.

FIG. 7 illustrates example misattribution-corrected unique audience values and example misattribution-corrected impression counts determined based on the example IA factors of FIG. 5 and example impression frequencies for different demographic groups.

DETAILED DESCRIPTION

Figure 1:
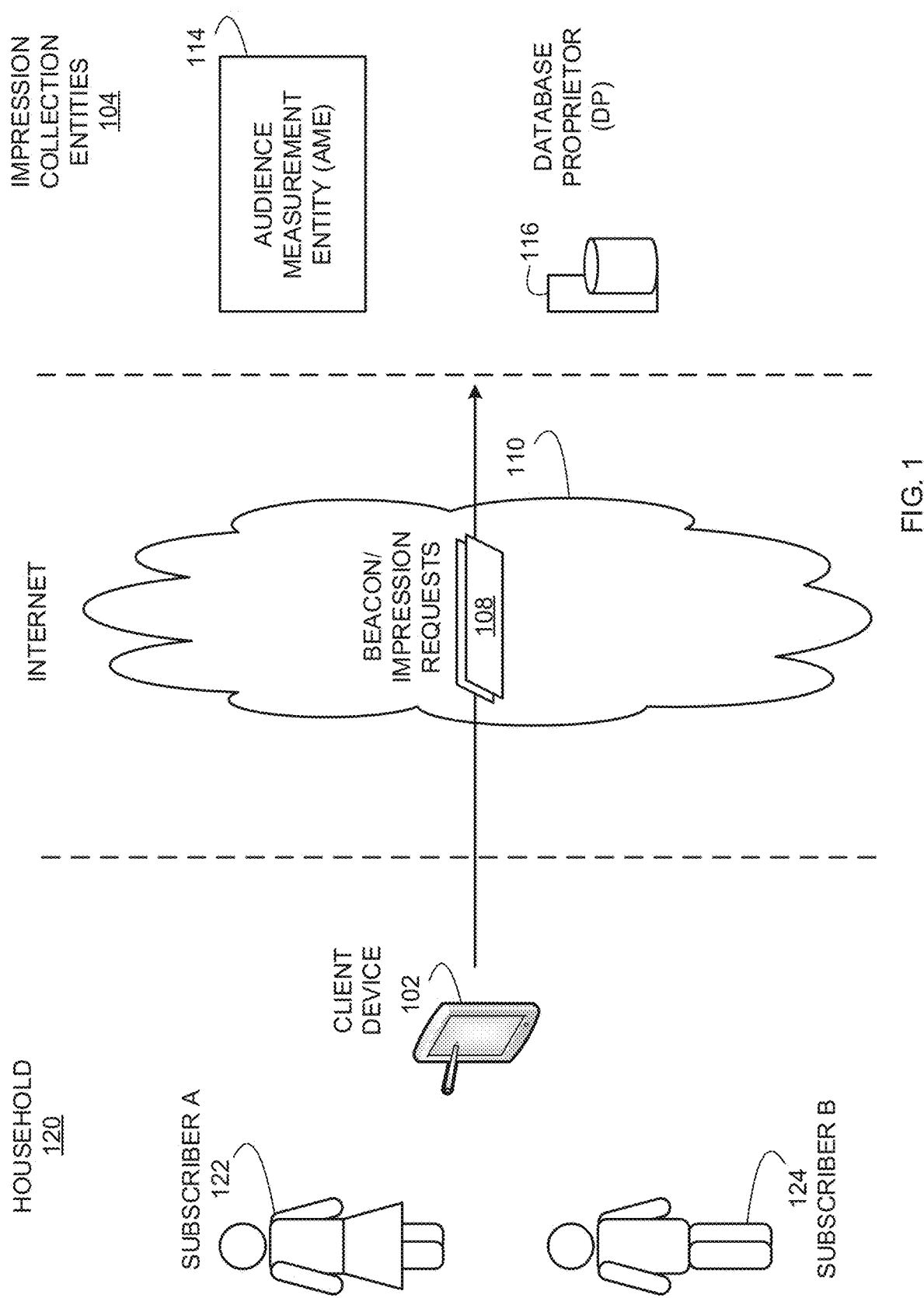
FIG. 1 illustrates an example client device that reports audience impressions for media to impression collection entities to facilitate identifying total impressions and sizes of unique audiences exposed to different media.

Techniques for monitoring user access to Internet-accessible media such as web pages, advertisements, content and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from the server to increase the server log counts. Secondly, media is sometimes retrieved once, cached locally and then repeatedly viewed from the local cache without involving the server in the repeat viewings. Server logs cannot track these repeat views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the hypertext markup language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

Audience measurement entities and/or other businesses often desire to link demographics to the monitoring information. To address this issue, the AME establishes a panel of users who have agreed to provide their demographic information and to have their Internet browsing activities monitored. When an individual joins the panel, they provide detailed information concerning their identity and demographics (e.g., gender, age, ethnicity, income, home location, occupation, etc.) to the AME. The audience measurement entity sets a cookie on the panelist computer that enables the audience measurement entity to identify the panelist whenever the panelist accesses tagged media and, thus, sends monitoring information to the audience measurement entity.

Since most of the clients providing monitoring information from the tagged media are not panelists and, thus, are unknown to the audience measurement entity, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers, email providers, etc. such as Facebook, Myspace, Twitter, Yahoo!, Google, etc. These database proprietors set cookies or other device/user identifiers on the client devices of their subscribers to enable the database proprietor to recognize the user when they visit their website.

The protocols of the Internet make cookies inaccessible outside of the domain (e.g., Internet domain, domain name, etc.) on which they were set. Thus, a cookie set, for example, in the amazon.com domain is accessible to servers in the amazon.com domain, but not to servers outside that domain. Therefore, although an audience measurement entity might find it advantageous to access the cookies set by the database proprietors, they are unable to do so.

The inventions disclosed in Mainak et al., U.S. Pat. No. 8,370,489, which is incorporated by reference herein in its entirety, enable an audience measurement entity to leverage the existing databases of database proprietors to collect more extensive Internet usage and demographic data by extending the beaconing process to encompass partnered database proprietors and by using such partners as interim data collectors. The inventions disclosed in Mainak et al. accomplish this task by structuring the AME to respond to beacon requests from clients (who may not be a member of an audience member panel and, thus, may be unknown to the audience member entity) and redirect the client from the audience measurement entity to a database proprietor such as a social network site partnered with the audience member entity. The redirection initiates a communication session between the client accessing the tagged media and the database proprietor. The database proprietor (e.g., Facebook) can access any cookie it has set on the client to thereby identify the client based on the internal records of the database proprietor. In the event the client corresponds to a subscriber of the database proprietor, the database proprietor logs an impression in association with the demographics data associated with the client and subsequently forwards logged impressions to the audience measurement company. In the event the client does not correspond to a subscriber of the database proprietor, the database proprietor may redirect the client to the audience measurement entity and/or another database proprietor. The audience measurement entity may respond to the redirection from the first database proprietor by redirecting the client to a second, different database proprietor that is partnered with the audience measurement entity. That second database proprietor may then attempt to identify the client as explained above. This process of redirecting the client from database proprietor to database proprietor can be performed any number of times until the client is identified and the media exposure logged, or until all database proprietor partners have been contacted without a successful identification of the client. The redirections all occur automatically so the user of the client is not involved in the various communication sessions and may not even know they are occurring.

Periodically or aperiodically the partnered database proprietors provide their logs and demographic information to the audience measurement entity which then compiles the collected data into statistical reports accurately identifying the demographics of persons accessing the tagged media. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the media access being logged as well as the identity of the media itself from the database proprietors (thereby protecting the privacy of the media sources), without compromising the ability of the database proprietors to log impressions for their subscribers. Further, when cookies are used as device/user identifiers, the Internet security cookie protocols are complied with because the only servers that access a given cookie are associated with the Internet domain (e.g., Facebook.com) that set that cookie.

Examples disclosed in Mainak et al. (U.S. Pat. No. 8,370,489) can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social media sites such as Facebook, Twitter, Google, etc. Such extension effectively leverages the media tagging capabilities of the ratings entity and the use of databases of non-ratings entities such as social media and other websites to create an enormous, demographically accurate panel that results in accurate, reliable measurements of exposures to Internet media such as advertising and/or programming.

In illustrated examples disclosed herein, media exposure is measured in terms of online Gross Rating Points. A Gross Rating Point (GRP) is a unit of measurement of audience size that has traditionally been used in the television ratings context. It is used to measure exposure to one or more media (e.g., programs, advertisements, etc.) without regard to multiple exposures of the same media to individuals. In terms of television (TV) advertisements, one GRP is equal to 1% of TV households. While GRPs have traditionally been used as a measure of television viewership, examples disclosed herein may be used in connection with generating online GRPs for online media to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements, exposure to radio advertisements and online media, etc. Because examples disclosed herein may be used to correct impressions that associate exposure measurements with corresponding demographics of users, the information processed using examples disclosed herein may also be used by advertisers to more accurately identify markets reached by their advertisements and/or to target particular markets with future advertisements.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposures to those panelists and different demographic markets. Unlike traditional techniques in which audience measurement entities rely solely on their own panel member data to collect demographics-based audience measurements, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of the AMA's demographics-based audience measurements. Such access also enables the audience measurement entity to monitor persons who would not otherwise have joined an audience measurement panel. Any entity having a network-accessible database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

To increase the likelihood that measured viewership is accurately attributed to the correct demographics, examples disclosed herein use demographic information located in the audience measurement entity's records as well as demographic information located at one or more database proprietors that maintain records or profiles of users having accounts therewith. In this manner, examples disclosed herein may be used to supplement demographic information maintained by a ratings entity (e.g., an AME such as The Nielsen Company of Schaumburg, Illinois, United States of America, that collects media exposure measurements and/or demographics) with demographic information from one or more different database proprietors.

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to herein as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as database proprietors) maintain detailed demographic information (e.g., age, gender, geographic location, race, income level, education level, religion, etc.) collected via user registration processes. As used herein, an impression is defined to be an event in which a home or individual is exposed to corresponding media (e.g., content and/or an advertisement). Thus, an impression represents a home or an individual having been exposed to media (e.g., an advertisement, content, a group of advertisements, and/or a collection of content). In Internet advertising, a quantity of impressions or impression count is the total number of times media (e.g., content, an advertisement or advertisement campaign) has been accessed by a web population (e.g., the number of times the media is accessed). As used herein, a demographic impression is defined to be an impression that is associated with a characteristic (e.g., a demographic characteristic) of the person exposed to the media.

Although such techniques for collecting media impressions are based on highly accurate demographic information, in some instances collected impressions may be misattributed to the wrong person and, thus, associated with incorrect demographic information. For example, in a household having multiple people that use the same client device (e.g., the same computer, tablet, smart internet appliance, etc.), collected impressions from that client device may be misattributed to a member of the household that is not the current user of the client device. That is, when an online user visits a website and is exposed to an advertisement on that site that has been tagged with beacon instructions, there is a redirect to a server of a database proprietor (e.g., Facebook, Yahoo, Google, etc.). The database proprietor then looks into a most recent cookie set by the database proprietor in the web browser of that client device. The database proprietor then attributes the impression to the user account corresponding to the cookie value. For example, the cookie value is one that was previously set in the client device by the database proprietor to correspond to a particular registered user account of the person that used the client device to most recently log into the website of that database proprietor. After collecting and attributing the impression to the user account associated with the retrieved cookie value, the database proprietor aggregates the total collected impressions and the size of the unique audience based on demographics associated with user accounts for all logged impressions. When this occurs over time and across many households, a number of collected impressions are misattributed to the wrong demographic information because some people use client devices after another person (e.g., another household member) has logged into a user account registered with the database proprietor without logging themselves (e.g., the current audience member) in. As such, a cookie corresponding to the previous person is still accessed from the client device while the subsequent user of the client device (e.g., a user that did not log into a corresponding user account registered with the database proprietor) accesses media on the client device which causes impressions to be misattributed to the previous person associated with the accessed cookie.

As used herein, a unique audience measure is based on audience members distinguishable from one another. That is, a particular audience member exposed to particular media is measured as a single unique audience member regardless of how many times that audience member is exposed to that particular media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

As used herein, total impressions refers to the total number of collected impressions for particular media regardless of whether multiple ones of those impressions are attributable to the same audience members. That is, multiple impressions accounted for in the total impressions may be attributable to a same audience member.

Misattribution is a measurement error that typically arises when impressions are collected from a same client device that is shared by multiple people in that a media impression caused by one person that is currently using the client device is incorrectly attributed (i.e., misattributed) to another person that previously used the same client device. Sharing of a client device can occur between two individuals who: (1) live in the same household, and/or (2) have access to the same client device. Misattribution occurs when, for a particular media exposure on a client device, a logged-in-user of a database proprietor service (e.g., Facebook) is not the same as the current user of the client device that is being exposed to the media. For example, if person A logs into the database proprietor's website in the morning on a client device, but person B uses the same client device in the afternoon without logging in (e.g., without user A logging out) and is exposed to media tagged with beacon instructions, the database proprietor attributes the impression to person A since he/she was the last person to log into the database proprietor's site from that client device, while actually it was person B who was using the client device when the media was presented.

Examples disclosed herein can be used to correct misattribution in collected impressions by applying a misattribution correction to impression data obtained from a database proprietor (e.g., Facebook, Yahoo, Google, etc.) after a profile correction (e.g., a Decision Tree (DT) model) has been applied to the impression data. Examples disclosed herein may be implemented by an audience measurement entity (e.g., any entity interested in measuring or tracking audience exposures to advertisements, content, and/or any other media) in cooperation with any number of database proprietors such as online web services providers. Such database proprietors/online web services providers may be social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), and/or any other web service(s) site that maintains user registration records.

Example methods and/or articles of manufacture comprising computer readable instructions disclosed herein may be used to receive, at a first internet domain, a first request from a client device, the first request indicative of access to media at the client device. In such examples, a response is sent from the first internet domain to the client device. In such examples, the response instructs the client device to send a second request to a second internet domain. In such examples, the second request is to be indicative of the access to the media at the client device. In such examples, an impressions adjustment factor is determined for a first demographic group based on first impressions reported by the client device to the first internet domain and second impressions reported by the client device to the second internet domain. In such example, the first and second impressions correspond to the same media accessed on the client device. In such examples, a misattribution-corrected impressions count is determined for the first demographic group based on the impressions adjustment factor and based on a second impressions count determined at the second internet domain for the first demographic group. In such examples, the second impressions count includes an error based on some of the second impressions being misattributed at the second internet domain to the first demographic group when the some of the second impressions correspond to a second demographic group.

In some examples, determining the misattribution-corrected impression count involves shifting an impression from the second impressions count corresponding to the first demographic group to a third impressions count corresponding to the second demographic group based on the impressions adjustment factor. In some examples, the first impressions are reported by the client device to an audience measurement entity at the first internet domain that does not provide the media to the client device, and a user of the client device is a panel member of the audience measurement entity. In some examples, the second impressions are reported by the client device to a social network service at the second internet domain to which a user of the client device is subscribed. In some examples, the impressions adjustment factor is to correct impression quantities having inaccuracies due to impressions incorrectly attributed to demographic data not corresponding to persons corresponding to the impressions.

In some examples, determining the impressions adjustment factor involves subtracting a first unique audience size determined by an audience measurement entity at the first internet domain based on the first impressions from a second unique audience size determined by a database proprietor at the second internet domain based on the second impressions to generate a difference. In such examples, the difference is divided by a total impressions count of the first impressions to determine the impressions adjustment factor.

In some examples, the error in the second impressions count is based on an entity at the second internet domain incorrectly identifying a user of the client device as belonging to the first demographic group when the user belongs to the second demographic group. In such examples, the misattribution-corrected impressions count comprises fewer impressions than the second impression count based on shifting an impression corresponding to the user from the second impressions count corresponding to the first demographic group to a third impressions count corresponding to the second demographic group based on the impressions adjustment factor.

In some examples, the misattribution-corrected impressions count is determined based on the impressions adjustment factor without communicating with individual online users about their online media access activities and without using survey responses from the online users to determine the error. In some examples, network communication bandwidth is conserved by not communicating with individual online users about their online media access activities and by not requesting survey responses from the online users to determine the error. In some examples, computer processing resources are conserved by not communicating with individual online users about their online media access activities and by not requesting survey responses from the online users to determine the error.

Example disclosed apparatus include an example impression collector to receive, at a first internet domain, a first request from a client device, the first request indicative of access to media at the client device. The example impression collector is also to send, from the first internet domain, a response to the client device, the response to instruct the client device to send a second request to a second internet domain, the second request to be indicative of the access to the media at the client device. Such example apparatus also include an impressions adjustment factor determiner to determine an impressions adjustment factor for a first demographic group based on first impressions reported by the client device to the first internet domain and second impressions reported by the client device to the second internet domain. In such examples, the first and second impressions correspond to the same media accessed on the client device. Such example apparatus also includes an impressions corrector to determine a misattribution-corrected impressions count for the first demographic group based on the impressions adjustment factor and based on a second impressions count determined at the second internet domain for the first demographic group. In such examples, the second impressions count includes an error based on some of the second impressions being misattributed at the second internet domain to the first demographic group when the some of the second impressions correspond to a second demographic group.

In some examples, the impressions corrector is to determine the misattribution-corrected impressions count by shifting an impression from the second impressions count corresponding to the first demographic group to a third impressions count corresponding to the second demographic group based on the impressions adjustment factor. In some examples, the first impressions are reported by the client device to an audience measurement entity at the first internet domain that does not provide the media to the client device. In some examples, a user of the client device is a panel member of the audience measurement entity. In some examples, the second impressions are reported by the client device to a social network service at the second internet domain to which a user of the client device is subscribed.

In some examples, the impressions adjustment factor determiner is to determine the impressions adjustment factor by subtracting a first unique audience size determined by an audience measurement entity at the first internet domain based on the first impressions from a second unique audience size determined by a database proprietor at the second internet domain based on the second impressions to generate a difference. In such examples, the difference is divided by a total impressions count of the first impressions.

In some examples, the impressions adjustment factor is to correct impression quantities having inaccuracies due to impressions incorrectly attributed to demographic data not corresponding to persons corresponding to the impressions. In some examples, the error in the second impressions count is based on an entity at the second internet domain incorrectly identifying a user of the client device as belonging to the first demographic group when the user belongs to the second demographic group. In some examples, the misattribution-corrected impressions count include fewer impressions than the second impression count based on shifting an impression corresponding to the user from the second impressions count corresponding to the first demographic group to a third impressions count corresponding to the second demographic group based on the impressions adjustment factor.

In some examples, the impressions corrector determines the misattribution-corrected impressions based on the impressions adjustment factor without communicating with individual online users about their online media access activities and without using survey responses from the online users to determine the error. In some examples, by determining the misattribution-corrected impressions using the impressions corrector, network communication bandwidth is conserved by not communicating with individual online users about their online media access activities and by not requesting survey responses from the online users to determine the error. In some examples, by determining the misattribution-corrected impressions using the impressions corrector, computer processing resources are conserved by not communicating with individual online users about their online media access activities and by not requesting survey responses from the online users to determine the error.

Example methods and/or articles of manufacture comprising computer readable instructions disclosed herein may be used to receive, at a first internet domain, a first request from a client device, the first request indicative of access to media at the client device. In such examples, a response is sent from the first internet domain to the client device. In such examples, the response is to instruct the client device to send a second request to a second internet domain. In such examples, the second request is to be indicative of the access to the media at the client device. In such examples, an audience adjustment factor is determined for a demographic group based on first impressions reported by the client device to the first internet domain and second impressions reported by the client device to the second internet domain. In such examples, the first and second impressions correspond to the same media accessed on the client device. In such examples, a misattribution-corrected unique audience size is determined for the demographic group based on the audience adjustment factor and based on a second unique audience size determined at the second internet domain for the demographic group. In such examples, the second unique audience size includes an error based on third impressions misattributed at the second internet domain to the demographic group when the third impressions correspond to another demographic group.

In some examples, determining the audience adjustment factor involves dividing a third unique audience size corresponding to the first impressions by a fourth unique audience size corresponding to the second impressions. In some examples, determining the misattribution-corrected unique audience size for the demographic group involves dividing the second unique audience size by the audience adjustment factor. In some examples, the first impressions are reported by the client device to an audience measurement entity at the first internet domain that does not provide the media to the client device, and a user of the client device is a panel member of the audience measurement entity. In some examples, the second impressions are reported by the client device to a social network service at the second internet domain to which a user of the client device is subscribed. In some examples, the audience adjustment factor is to correct unique audience size values having inaccuracies due to impressions incorrectly attributed to demographic data not corresponding to persons corresponding to the impressions.

In some examples, the error in the second unique audience size is based on an entity at the second internet domain incorrectly identifying a user of the client device as belonging to the demographic group when the user belongs to the another demographic group. In some such examples, the misattribution-corrected unique audience size is different than the second unique audience size based on dividing the second unique audience size by the audience adjustment factor.

In some examples, the misattribution-corrected unique audience size is determined based on the audience adjustment factor without communicating with individual online users about their online media access habits and without using survey responses from the online users to determine the error. In some examples, network communication bandwidth is conserved by not communicating with individual online users about their online media access habits and by not requesting survey responses from the online users to determine the error. In some examples, computer processing resources are conserved by not communicating with individual online users about their online media access habits and by not requesting survey responses from the online users to determine the error.

Example disclosed apparatus include an example impression collector to receive, at a first internet domain, a first request from a client device. In such examples, the first request is indicative of access to media at the client device. The example impression collector is also to send, from the first internet domain, a response to the client device. In such examples, the response is to instruct the client device to send a second request to a second internet domain. In such examples, the second request is to be indicative of the access to the media at the client device. Such example apparatus also include an audience adjustment factor determiner to determine an audience adjustment factor for a demographic group based on first impressions reported by the client device to the first internet domain and second impressions reported by the client device to the second internet domain. In such examples, the first and second impressions correspond to the same media accessed on the client device. Such example apparatus also include a unique audience corrector to determine a misattribution-corrected unique audience size for the demographic group based on the audience adjustment factor and based on a second unique audience size determined at the second internet domain for the demographic group. In such examples, the second unique audience size includes an error based on third impressions misattributed at the second internet domain to the demographic group when the third impressions correspond to another demographic group.

In some examples, the audience adjustment factor determiner is to determine the audience adjustment factor by dividing a third unique audience size corresponding to the first impressions by a fourth unique audience size corresponding to the second impressions. In some examples, the unique audience corrector is to determine the misattribution-corrected unique audience size for the demographic group by dividing the second unique audience size by the audience adjustment factor. In some examples, the first impressions are reported by the client device to an audience measurement entity at the first internet domain that does not provide the media to the client device, and a user of the client device is a panel member of the audience measurement entity. In some examples, the second impressions are reported by the client device to a social network service at the second internet domain to which a user of the client device is subscribed. In some examples, the audience adjustment factor is to correct unique audience size values having inaccuracies due to impressions incorrectly attributed to demographic data not corresponding to persons corresponding to the impressions.

In some examples, the error in the second unique audience size is based on an entity at the second internet domain incorrectly identifying a user of the client device as belonging to the demographic group when the user belongs to the another demographic group. In some such examples, the misattribution-corrected unique audience size comprising dividing the second unique audience size by the audience adjustment factor.

In some examples, the unique audience corrector is to determine the misattribution-corrected unique audience size based on the audience adjustment factor without communicating with individual online users about their online media access habits and without using survey responses from the online users to determine the error. In some examples, by determining the misattribution-corrected unique audience size, the unique audience corrector conserves network communication bandwidth by not communicating with individual online users about their online media access habits and by not requesting survey responses from the online users to determine the error. In some examples, by determining the misattribution-corrected unique audience size, the unique audience corrector conserves computer processing resources by not communicating with individual online users about their online media access habits and by not requesting survey responses from the online users to determine the error.

FIG. 1 illustrates an example client device 102 that reports audience impressions for media to impression collection entities 104 to facilitate identifying total impressions and sizes of unique audiences exposed to different media. As used herein, the term impression collection entity refers to any entity that collects impression data. The client device 102 of the illustrated example may be any device capable of accessing media over a network. For example, the client device 102 may be a computer, a tablet, a mobile device, a smart television, or any other Internet-capable device or appliance. Examples disclosed herein may be used to collect impression information for any type of media including content and/or advertisements. Media may include advertising and/or content such as web pages, streaming video, streaming audio, movies, and/or any other type of content and/or advertisement deliver via satellite, broadcast, cable television, radio frequency (RF) terrestrial broadcast, Internet (e.g., internet protocol television (IPTV)), television broadcasts, radio broadcasts and/or any other vehicle for delivering media. In some examples, media includes user-generated media that is, for example, uploaded to media upload sites such as YouTube and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

In the illustrated example, the client device 102 employs a web browser and/or applications (e.g., apps) to access media, some of which include instructions that cause the client device 102 to report media monitoring information to one or more of the impression collection entities 104. That is, when the client device 102 of the illustrated example accesses media, a web browser and/or application of the client device 102 executes instructions in the media to send a beacon request or impression request 108 to one or more of the impression collection entities 104 via, for example, the Internet 110. The beacon requests 108 of the illustrated example include information about accesses to media at the client device 102. Such beacon requests 108 allow monitoring entities, such as the impression collection entities 104, to collect impressions for different media accessed via the client device 102. In this manner, the impression collection entities 104 can generate large impression quantities for different media (e.g., different content and/or advertisement campaigns).

The impression collection entities 104 of the illustrated example include an example audience measurement entity (AME) 114 and an example database proprietor (DP) 116. In the illustrated example, the AME 114 does not provide the media to the client device 102 and is a trusted (e.g., neutral) third party (e.g., The Nielsen Company, LLC) for providing accurate media access statistics. In the illustrated example, the database proprietor 116 is one of many database proprietors that operates on the Internet to provide services to large numbers of subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit reporting services (e.g., Experian) and/or any other web service(s) site that maintains user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscribers provide detailed demographic information to the database proprietor 116. Demographic information may include, for example, gender, age, ethnicity, income, home location, education level, occupation, etc. In the illustrated example, the database proprietor 116 sets a device/user identifier (e.g., an identifier described below in connection with FIG. 2) on a subscriber's client device 102 that enables the database proprietor 116 to identify the subscriber.

In the illustrated example, when the database proprietor 116 receives a beacon/impression request 108 from the client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate demographic impressions by associating demographic information with an audience impression for the media accessed at the client device 102. As explained above, a demographic impression is an impression that is associated with a characteristic (e.g., a demographic characteristic) of the person exposed to the media.

In the illustrated example, the AME 114 establishes an AME panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist. An AME panel may be a cross-platform home television/computer (TVPC) panel built and maintained by the AME 114. In other examples, the AME panel may be a computer panel or internet-device panel without corresponding to a television audience panel. In yet other examples, the AME panel may be a cross-platform radio/computer panel and/or a panel formed for other mediums.

In the illustrated example, when the AME 114 receives a beacon request 108 from the client device 102, the AME 114 requests the client device 102 to provide the AME 114 with the device/user identifier that the AME 114 previously set in the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience impression for the media accessed at the client device 102.

In the illustrated example, the client device 102 is used in an example household 120 in which household members 122 and 124 (identified as subscriber A 122 and subscriber B 124) are subscribers of an internet-based service offered by the database proprietor 116. In the illustrated example, subscriber A 122 and subscriber B 124 share the client device 102 to access the internet-based service of the database proprietor 116 and to access other media via the Internet 110. In the illustrated example, when the database proprietor 116 receives a beacon/impression request 108 for media accessed via the client device 102, the database proprietor 116 logs an impression for the media access as corresponding to the subscriber 122, 124 of the household 120 that most recently logged into the database proprietor 116. Misattributions of impressions logged by the database proprietor 116 are likely to occur in circumstances similar to the example household 120 of FIG. 1 in which multiple people in a household share a client device. For example, if the subscriber A 122 logs into a service of the database proprietor 116 on the client device 102, and the subscriber B 124 subsequently uses the client device 102 without logging in to the service of the database proprietor 116, the database proprietor 116 attributes logged impression to the subscriber A 122 even though the use is actually by subscriber B 124 because the subscriber A 122 was the last person to log into the database proprietor 116 and, thus, the subscriber A 122 was most recently identified by the database proprietor 116 as the subscriber using the client device 102. As such, even though the subscriber B 124 was subsequently using the client device 102, impressions logged by the database proprietor 116 during such use are not attributed to the correct person (i.e., the subscriber B 124) because the most recent login detected by the database proprietor 116 corresponded to the subscriber A 122. In the illustrated example, logins are used by the database proprietor 116 to identify subscribers using particular devices by associating device/user identifiers on the client devices with subscriber accounts at the database proprietor 116 corresponding to usernames used during the logins. As such, the database proprietor 116 assumes that the most recent login is indicative of a subscriber using the client device 102 until another login event is received at the database proprietor 116 that identifies a different subscriber. Such assumptions based on the most recent login lead to the above-described misattributions.

Figure 2:
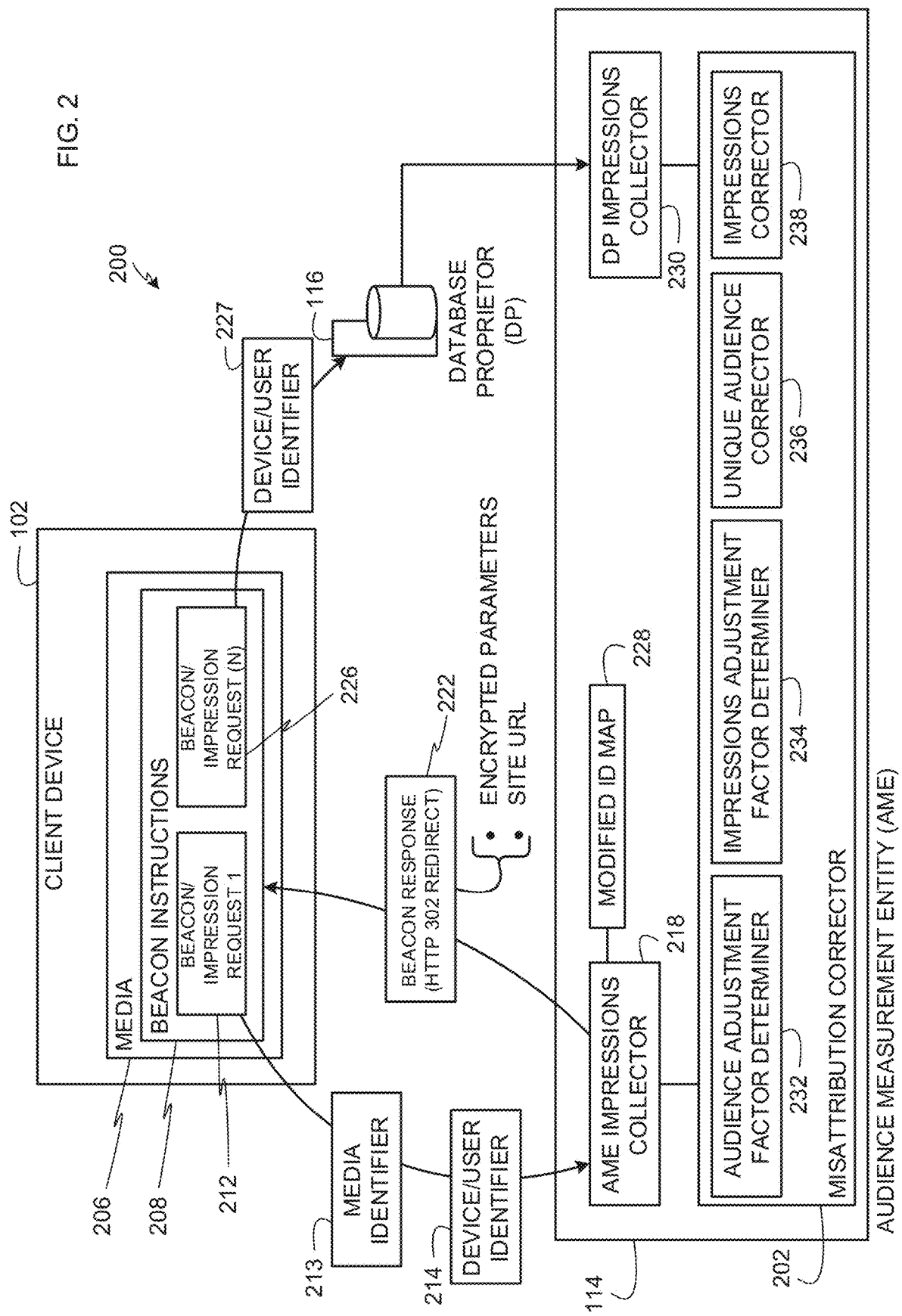
FIG. 2 is an example communication flow diagram of an example manner in which an audience measurement entity (AME) and a database proprietor (DP) can collect impressions and demographic information based on a client device reporting impressions to the AME and the DP.

FIG. 2 illustrates an example communication flow diagram of an example manner in which the AME 114 and the database proprietor 116 of FIG. 1 can collect impressions and demographic information based on the client device 102 reporting impressions to the AME 114 and the database proprietor 116. FIG. 2 also shows an example misattribution corrector 202. The misattribution corrector 202 of the illustrated example is to correct unique audience sizes and impression counts that are based on impressions reported by client devices (e.g., the client device 102) and for which the database proprietor 116 has misattributed some of those impressions to incorrect people and, thus, incorrect demographic information. The example chain of events shown in FIG. 2 occurs when the client device 102 accesses media for which the client device 102 reports an impression to the AME 114 and the database proprietor 116. In some examples, the client device 102 reports impressions for accessed media based on instructions (e.g., beacon instructions) embedded in the media that instruct the client device 102 (e.g., instruct a web browser or an app in the client device 102) to send beacon/impression requests (e.g., the beacon/impression requests 108 of FIG. 1) to the AME 114 and/or the database proprietor 116. In such examples, the media having the beacon instructions is referred to as tagged media. In other examples, the client device 102 reports impressions for accessed media based on instructions embedded in apps or web browsers that execute on the client device 102 to send beacon/impression requests (e.g., the beacon/impression requests 108 of FIG. 1) to the AME 114, and/or the database proprietor 116 for corresponding media accessed via those apps or web browsers. In any case, the beacon/impression requests (e.g., the beacon/impression requests 108 of FIG. 1) include device/user identifiers (e.g., AME IDs and/or DP IDs) as described further below to allow the corresponding AME 114 and/or database proprietor 116 to associate demographic information with resulting logged impressions.

In the illustrated example, the client device 102 accesses media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 to the AME impression collector 218 using an HTTP (hypertext transfer protocol) request addressed to the URL (uniform resource locator) of the AME impressions collector 218 at, for example, a first internet domain of the AME 114. The beacon/impression request 212 of the illustrated example includes a media identifier 213 (e.g., an identifier that can be used to identify content, an advertisement, and/or any other media) corresponding to the media 206. In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 (e.g., in response to, for example, the AME impressions collector 218 receiving the beacon/impression request 212).

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the AME 114 stores in association with demographic information about users of the client devices 102. When the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102.

In some examples, the beacon/impression request 212 may not include the device/user identifier 214 if, for example, the user of the client device 102 is not an AME panelist. In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 will still benefit from logging an impression for the media 206 even though it will not have corresponding demographics. For example, the AME 114 may still use the logged impression to generate a total impressions count and/or a frequency of impressions (e.g., an impressions frequency) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second internet domain. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a predefined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the DP requests the same (e.g., in response to the beacon/impression request 226). In some examples, the device/user identifier 227 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 116 stores in association with demographic information about subscribers corresponding to the client devices 102. When the database proprietor 116 receives the device/user identifier 227, the database proprietor 116 can obtain demographic information corresponding to a user of the client device 102 based on the device/user identifier 227 that the database proprietor 116 receives from the client device 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

In some examples that use cookies as the device/user identifier 227, when a user deletes a database proprietor cookie from the client device 102, the database proprietor 116 sets the same cookie value in the client device 102 the next time the user logs into a service of the database proprietor 116. In such examples, the cookies used by the database proprietor 116 are registration-based cookies, which facilitate setting the same cookie value after a deletion of the cookie value has occurred on the client device 102. In this manner, the database proprietor 116 can collect impressions for the client device 102 based on the same cookie value over time to generate unique audience (UA) sizes while eliminating or substantially reducing the likelihood that a single unique person will be counted as two or more separate unique audience members.

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226 to numerous database proprietors. For example, the beacon instructions 208 may cause the client device 102 to send the beacon/impression requests 226 to the numerous database proprietors in parallel or in daisy chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding impression. In any case, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 230 of the AME 114 as, for example, batch data. As discussed above, some impressions logged by the client device 102 to the database proprietor 116 are misattributed by the database proprietor 116 to a wrong subscriber and, thus, to incorrect demographic information. During a data collecting and merging process to combine demographic and impression data from the AME 114 and the database proprietor 116, demographics of impressions logged by the AME 114 for the client device 102 will not correspond to demographics of impressions logged by the database proprietor 116 because the database proprietor 116 has misattributed some impressions to the incorrect demographic information. Examples disclosed herein may be used to determine an impressions adjustment factor to correct/adjust impression-based data (e.g., total impressions and unique audience size) provided by the database proprietor 116.

Additional examples that may be used to implement the beacon instruction processes of FIG. 2 are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

In the example of FIG. 2, the AME 114 includes the example misattribution corrector 202 to correct unique audience values and impression counts that are based on impressions reported by client devices (e.g., the client device 102) for which the database proprietor 116 has misattributed some of the impressions to incorrect demographic information. The misattribution corrector 202 of the illustrated example is provided with an example audience adjustment factor determiner 232, an example impressions adjustment factor determiner 234, an example unique audience corrector 236, and an example impressions corrector 238.

The example audience adjustment factor determiner 232 of FIG. 2 is provided to calculate a unique audience (UA) adjustment factor representative of an inaccurate UA size that is based on misattributed impressions relative to a UA size that is based on accurately attributed impressions. As discussed above, misattribution occurs when the database proprietor 116 identifies the wrong person as being a current user of the client device 102 when the client device reports an impression for accessed media to the database proprietor 116. The example impressions adjustment factor determiner 234 is provided to calculate an impressions adjustment factor representative of an amount of misattributed impressions relative to an amount of correctly attributed impressions.

The example unique audience corrector 236 of FIG. 2 is provided to correct unique audience sizes or quantities by applying the impressions adjustment factor (determined by the impressions adjustment factor determiner 234) to total unique audience sizes corresponding to total impressions collected by the AME 114. The example impressions corrector 238 is provided to correct an impressions count by applying the impressions adjustment factor (determined by the impressions adjustment factor determiner 234) to the total number of impressions collected by the AME 114.

Although the misattribution corrector 202 is shown in the illustrated example as being located in the AME 114, the misattribution corrector 202 may alternatively be located at any other location such as at the database proprietor 116 or at any other suitable location (e.g., location(s) separate from the AME 114 and the database proprietor 116). In addition, although the AME impressions collector 218, the modified ID map 228, and the DP impressions collector 230 are shown separate from the misattribution corrector 202, one or more of the AME impressions collector 218, the modified ID map 228, and/or the DP impressions collector 230 may be implemented in the misattribution corrector 202.

While an example manner of implementing the example misattribution corrector 202, the example impressions collector 218, the example modified ID map 228, the example DP impressions collector 230, the example audience adjustment factor determiner 232, the example impressions adjustment factor determiner 234, the example unique audience corrector 236, and the example impressions corrector 238 is illustrated in FIG. 2, one or more of the elements, processes and/or devices illustrated in FIG. 2 may be combined, divided, re-arranged, omitted, eliminated and/or implemented in any other way. Further, the example misattribution corrector 202, the example AME impressions collector 218, the example modified ID map 228, the example DP impressions collector 230, the example audience adjustment factor determiner 232, the example impressions adjustment factor determiner 234, the example unique audience corrector 236, and/or the example impressions corrector 238 of FIG. 2 may be implemented by hardware, software, firmware and/or any combination of hardware, software, and/or firmware. Thus, for example, any of the example misattribution corrector 202, the example AME impressions collector 218, the example modified ID map 228, the example DP impressions collector 230, the example audience adjustment factor determiner 232, the example impressions adjustment factor determiner 234, the example unique audience corrector 236, and/or the example impressions corrector 238 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example misattribution corrector 202, the example AME impressions collector 218, the example modified ID map 228, the example DP impressions collector 230, the example audience adjustment factor determiner 232, the example impressions adjustment factor determiner 234, the example unique audience corrector 236, and/or the example impressions corrector 238 is/are hereby expressly defined to include a tangible computer readable storage device or storage disk such as a memory, a digital versatile disk (DVD), a compact disk (CD), a Blu-ray disk, etc. storing the software and/or firmware. Further still, the example misattribution corrector 202, the example impressions collector 218, the example modified ID map 228, the example DP impressions collector 230, the example audience adjustment factor determiner 232, the example impressions adjustment factor determiner 234, the example unique audience corrector 236, and/or the example impressions corrector 238 of FIG. 2 may include one or more elements, processes and/or devices in addition to, or instead of, those illustrated in FIG. 2, and/or may include more than one of any or all of the illustrated elements, processes and devices.

Examples disclosed herein to correct impression-based data (e.g., total impressions and unique audience size) provided by the database proprietor 116 involve generating an adjustment factor based on impressions collected by the AME 116 and correctly attributed to demographic information for corresponding AME panelists. The misattribution corrector 202 of FIG. 2 may be implemented using the example techniques below to correct impression-based data that is based on impressions of which some are misattributed to the wrong demographic information by the database proprietor 116.

Examples disclosed herein involve using impressions logged by the AME 114 in association with demographic data collected from AME panel members to calculate an audience adjustment factor using example Equation 1 below and an impression adjustment factor using example Equation 2 below. Audience adjustment factors determined using example Equation 1 can be used to correct unique audience size values having inaccuracies due to misattributions of impressions by database proprietors. Impression adjustment factors determined using example Equation 2 below can be used to correct impression quantities having inaccuracies due to misattributions of impressions by database proprietors.

In the illustrated example of FIG. 2, the audience adjustment factor determiner 232 can use example Equation 1 below to determine an audience adjustment factor ($f_{i,j}$) for persons in a demographic group (j) that accessed media (i).

$$f_{i,j} = \frac{\Sigma_{i,j} F_{i,j}}{\Sigma_{i,j} T_{i,j}} \qquad \text{Equation 1}$$

In example Equation 1 above, $f_{i,j}$ is the adjustment factor for a unique audience (UA) size of a particular demographic group (j) that accessed media (i), $F_{i,j}$ is a database proprietor (DP) UA count of the number of AME panelists of the AME 114 that the database proprietor 116 observes (e.g., recognizes, identifies, logs impressions for, etc.) in the demographic group (j) as accessing the media (i), and $T_{i,j}$ is an AME UA count of AME panelists that the AME 114 observes in the demographic group (j) as accessing the media (i).

In the illustrated example of FIG. 2, the impressions adjustment factor determiner 234 employs example Equation 2 below to determine an impressions adjustment factor ($k_{i,j}$) for persons in a demographic group (j) that accessed media (i).

$$k_{i,j} = \frac{\Sigma_{i,j} Q_{i,j}}{\Sigma_i S_i} - \frac{\Sigma_{i,j} R_{i,j}}{\Sigma_i S_i} = \frac{\Sigma_{i,j} Q_{i,j} - \Sigma_{i,j} R_{i,j}}{\Sigma_i S_i} \qquad \text{Equation 2}$$

In example Equation 2 above, $k_{i,j}$ is the impressions adjustment factor for impressions logged for a particular demographic group (j) that accessed media (i), $R_{i,j}$ is a DP UA count of the number of AME panelists of the AME 114 that the database proprietor 116 observes (e.g., recognizes, identifies, logs impressions for, etc.) in the demographic group (j) as accessing the media (i), $Q_{i,j}$ is an AME UA count of AME panelists that the AME 114 observes in the demographic group (j) as accessing the media (i), and $S_i$ is the total AME impressions of AME panelists (summed across all demographic groups) that accessed media (i).

FIG. 3 illustrates an example table 300 with example AME impressions 302 collected by the AME 114 and example DP impressions 304 collected by the database proprietor 116 for different demographic groups (e.g., females younger than 50 years (F<50), females 50 years old and older (F>=50), males younger than 50 years (M<50), and males 50 years old and older (M>=50)). The example AME impressions 304 and the example DP impressions 304 shown in the example table 300 are development or test impressions that are collected by the AME 114 and the DP 116 during an adjustment factors development phase (e.g., an adjustment factors development phase 802 of FIG. 8) with the purpose of calculating adjustment factors (e.g., audience adjustment (AA) factors 402 of FIGS. 4 and 6 and impression adjustment (IA) factors 502 of FIGS. 5 and 6) that can be subsequently used on large logs of real impressions collected by the database proprietor 116 to correct for impression misattributions that affect unique audience sizes and impression counts that are generated using the database proprietor's logged impressions.

In the illustrated example of FIG. 3, the DP impressions 304 have an example misattribution error 308 for impression #9 (IMP #9). That is, the impressions 302, 304 collected by both the AME 114 and the database proprietor 116 are based on client devices (e.g., the client device 102) having users that are both (1) AME panelists of the AME 114 and (2) registered subscribers of the database proprietor 116. When the AME 114 logs an impression based on, for example, the beacon/impression request 212 of FIG. 2 from a panelist of the AME 114, the AME 114 logs an accurate impression. In the illustrated example of FIG. 3, such AME impressions 302 are also referred to as truth impressions 302 because the AME 114 regards them as correctly associated with corresponding demographic information of the current user of the client device 102. In some examples, to assure the accuracy of the AME impressions 302, the AME 114 incentivizes (e.g., through cash or other rewards) AME panel members to login to an AME website whenever the AME panel members begin using a client device 102. In this manner, the AME 114 can accurately set and/or associate an AME ID (e.g., the device/user identifier 214 of FIG. 2) with an AME panelist that is currently using the client device 102.

Unlike the known accuracy, or truth, of the AME impressions 302, there are no assurances that the DP impressions 304 are accurately associated with correct demographic information. That is, subscribers of the database proprietor 116 may not be incentivized to login to a website or service of the database proprietor 116 when the subscribers begin using a client device 102. As such, the database proprietor 116 is sometimes unable to accurately set and/or associate a DP ID (e.g., the device/user identifier 227 of FIG. 2) with a person that is currently using the client device 102. The misattributions present in the development or test impressions of the table 300 of FIG. 3 are representative of the types of misattributions that the database proprietor 116 is likely to make when logging impressions for persons that may or may not be AME panelists and/or may or may not be known to the database proprietor 116. Therefore, calculating adjustment factors based on the development impressions of the table 300 of FIG. 3 results in adjustment factors that can be used to correct for misattributions in impressions subsequently collected by the database proprietor 116 for other users.

In the illustrated example of FIG. 3, the example misattribution error 308 at impression #9 is created when the database proprietor 116 mis-recognizes an impression reported by the client device 102 (e.g., via the beacon/impression request 226 of FIG. 2) as being associated with demographic information for a male (M) of age 30. In the example table 300 of FIG. 3, a correct demographic impression at IMP #9 logged by the AME 114 for the same person (e.g., via the beacon/impression request 212 of FIG. 2) shows that the correct demographics indicate that the actual person corresponding to the impression is a female (F) of age 29. Example Equations 1 and 2 above may be used to correct unique audience sizes and total impression counts that are affected by misattribution errors such as the misattribution error 308 of FIG. 3.

FIG. 4 illustrates an example table 400 with example audience adjustment (AA) factors 402 (e.g., the audience adjustment factor ($f_{i,j}$) of Equation 1 above) for unique audience sizes of different demographic (DEMO) groups. Based on the AME impressions 302 of FIG. 3, the audience adjustment factor determiner 232 of FIG. 2 can use Equation 1 above to calculate the example audience adjustment factors 402 for different demographic groups (j) that access particular media (i). The example table 400 shows AME UA sizes 404 and example DP UA sizes 406 for different demographic groups. The example AME UA sizes 404 correspond to the term ($T_{i,j}$) of Equation 1 above, and the DP UA sizes 406 correspond to the term ($F_{i,j}$) of Equation 1 above. In the illustrated example of FIG. 4, the AME UA sizes 404 show that the AME impressions 302 of FIG. 3 include three (3) unique audience members of the F<50 demo group, one (1) unique audience member of the F>=50 demo group, two (2) unique audience members of the M<50 demo group, and one (1) unique audience member of the M>=50 demo group. The example DP UA sizes 406 show that the DP impressions 304 of FIG. 3 include two (2) unique audience members of the F<50 demo group, one (1) unique audience member of the F>=50 demo group, two (2) unique audience members of the M<50 demo group, and one (1) unique audience member of the M>=50 demo group.

The example DP UA sizes 406 have a misattribution-based error 410 for the F<50 demo group which results from the misattribution error 308 of FIG. 3. That is, the misattribution error 308 of FIG. 3 mistakenly identifies impression 9 (IMP #9) as corresponding to a male (M) of age 30 rather than the correct demographic of female (F) of age 29, as noted in the AME impression 302. Because of the misattribution error 308 of FIG. 3, impression 9 (IMP #9) for the DP impressions 304 is not counted for a female (F) of age 29. Therefore, the DP UA 406 of FIG. 4 for the F<50 demo group is only two (2), which is less than the correct (truth) unique audience for the F<50 demo group of three (3) as shown by the corresponding AME UA size 404. Because there were no other misattribution errors in the example impressions of FIG. 3, the DP UA sizes 406 match corresponding AME UA sizes 404 for the other demo groups.

In the illustrated example, the audience adjustment factor determiner 232 of FIG. 2 uses Equation 1 above to determine the AA factors 402. For example, for each of the demo groups F<50, F>=50, M<50, and M>=50, the audience adjustment factor determiner 232 divides the corresponding AME UA 404 ($T_{i,j}$) by the corresponding DP UA 406 ($F_{i,j}$) to determine the corresponding AA factor 402 for that demo group. As shown in the example table 400, the AA factor 402 corresponding to the DP UA 406 having the misattribution-based error 410, the corresponding AA factor 402 is 0.67 (e.g., $T_{i,j}/F_{i,j} => 3/2 = 0.67$).

FIG. 5 illustrates an example table 500 with example impression adjustment (IA) factors 502 (e.g., the impressions adjustment factor ($k_{i,j}$) of Equation 2 above) for total AME impression counts 504 and total DP impression counts 506 of different demographic groups (j) determined based on the example AME impressions 302 and the example DP impressions 304 of FIG. 3. In the illustrated example of FIG. 5, a misattribution-based error 508 occurs in association with the F<50 demographic group, and a misattribution-based error 510 occurs in association with the M<50 demographic group. The misattribution-based errors 508, 510 occur because of the misattribution error 308 of FIG. 3. That is, since the misattribution error 308 incorrectly indicates a male (M) of age 30 instead of the correct female (F) of age 29, the DP impressions count 506 for the F<50 demographic group has one fewer impression than the correct (truth) AME impressions count 504 for the F<50 demographic group. In addition, the DP impressions count 506 for the M<50 demographic group has one more impression than the correct (truth) AME impressions count for the M<50 demographic group.

In the illustrated example, the impressions adjustment factor determiner 234 of FIG. 2 uses Equation 2 above to determine the IA factors 502. For example, for each of the demo groups F<50, F>=50, M<50, and M>=50, the impressions adjustment factor determiner 234 processes Equation 2 using the corresponding AME impressions 504 ($Q_{i,j}$) of FIG. 5, the corresponding DP impressions 506 ($R_{i,j}$) of FIG. 5, and the total AME impressions count ($S_i$) summed across all demographic groups, to determine the corresponding IA factor 502 for that demo group. For example, using Equation 2 above, the impressions adjustment factor determiner 234 subtracts the DP impressions 506 ($R_{i,j}$) of a particular demographic group from the AME impressions 504 ($Q_{i,j}$) of the same demographic group, and divides the resulting difference by the total AME impressions count ($S_i$) summed across all demographic groups (e.g., IA factor 502=((AME impressions 504 ($Q_{i,j}$))−(DP impressions 506 ($R_{i,j}$)))/(total AME impressions count ($S_i$))).

As shown in the example table 500, the IA factor 502 corresponding to the F<50 demographic group having the misattribution-based error 508 is 11.11%, and the IA factor 502 corresponding to the M<50 demographic group having the misattribution-based error 510 is −11.11%. In the illustrated example, the IA factors 502 are 0.0% for the demographic groups not having misattribution-based errors. In the illustrated example, the impressions adjustment factor determiner 234 determines the misattribution-based error 508 of 11.11% for the F<50 demographic group based on Equation 2 above by subtracting the DP impressions 506 ($R_{i,j}$) of 3 for the F<50 demographic group shown in FIG. 5 from the AME impressions 504 ($Q_{i,j}$) of 4 for the F<50 demographic group shown in FIG. 5, and divides the resulting difference of one (1) by the total AME impressions count ($S_i$) of nine (9). Also in the illustrated example, the impressions adjustment factor determiner 234 determines the misattribution-based error 508 of −11.11% for the M<50 demographic group based on Equation 2 above by subtracting the DP impressions 506 ($R_{i,j}$) of 4 for the M<50 demographic group shown in FIG. 5 from the AME impressions 504 ($Q_{i,j}$) of 3 for the M<50 demographic group shown in FIG. 5, and divides the resulting difference of negative one (−1) by the total AME impressions count ($S_i$) of nine (9).

The IA factors 502 of the illustrated example are percentages of the total AME impressions count 504 summed across all demographic groups. Thus, the IA factor 502 of 11.11% corresponding to the F<50 demographic group means that 11.11% of 9 total AME impressions ($S_i$) (i.e., the sum of all of the AME impressions 504 logged across all of the demographic groups shown in FIG. 5) need to be added to the DP impressions count 506 for the F<50 demographic group. For example, 11.11% of nine (9) total AME impressions is one (1), which can be added to the three (3) DP impressions count 506 for the F<50 demographic group to make the DP impressions count 506 equal to the AME impressions count 504 for the F<50 demographic group. In addition, the IA factor 502 of −11.11% corresponding to the M<50 demographic group means that −11.11% of the nine (9) total AME impressions (i.e., the sum of all of the AME impressions 504 logged across all of the demographic groups shown in FIG. 5) need to be added (or 11.11% need to be subtracted) from the DP impressions count 506 for the M<50 demographic group. For example, −11.11% of nine (9) total AME impressions is negative one (−1), which can be added to the four (4) DP impressions count 506 for the M<50 demographic group to make the DP impressions count 506 equal to the AME impressions count 504 for the M<50 demographic group. Thus, the effect of the 11.11% IA factor 502 for the F<50 demographic group and the −11.11% IA factor 502 for the M<50 demographic group is that one (1) DP impression 506 is shifted away from the M<50 demographic group to the F<50 demographic group. In this manner, the total DP impressions 506 summed across all of the demographic groups remains the same after applying the IA factors 502.

FIG. 6 illustrates an example table 600 with misattribution-corrected UA size values 602 and misattribution-corrected impression counts 604 based on the AA factors 402 of FIG. 4 and the IA factors 502 of FIG. 5 for different demographic groups. The data of example table 600 illustrates how UA size values and impression counts received by the AME 114 in the aggregate (e.g., not individual impression records) from the database proprietor 116 can be adjusted to correct for misattribution-based errors. The aggregate DP UA size values are shown in the example table 600 as DP decision tree (DT)-corrected UA size values 606. The aggregate DP impression count values are shown in the example table 600 as DP DT-corrected impression counts 608. To generate the DP DT-corrected UA size values 606 and the DP DT-corrected impression counts 608, the database proprietor 116 performs a profile correction by applying a DT model on demographic data used to log impressions. That is, during initial registration with the database subscriber 116, some subscribers may provide inaccurate demographic information and/or may omit certain demographic information. To fill in some of the missing demographic information in subscriber accounts, the database proprietor 116 processes the demographic data in subscriber accounts using a DT model that produces the most likely outcomes for the missing demographic data. Any suitable DT model can be used by the database proprietor 116 to correct profile data for subscribers of the database proprietor 116.

In the illustrated example of FIG. 6, the example unique audience corrector 236 of FIG. 2 applies the AA factors 402 to the DT-corrected UA size values 606 to determine the misattribution-corrected UA size values 602. That is, the unique audience corrector 236 divides a DT-corrected UA size value 606 for a demographic group by a corresponding AA factor 402 for the same demographic group to calculate a corresponding misattribution-corrected UA size value 602 (e.g., (misattribution-corrected UA size)=(DT-corrected UA size)/(AA factor)). For example, for the F<50 demographic group, the unique audience corrector 236 divides the DT-corrected UA size value 606 of 63,000 by the corresponding AA factor 402 of 0.67 to calculate the misattribution-corrected UA size value 602 of 94,500 (e.g., 94,500=63,000/0.67). Thus, using the AA factors 402 in this manner to calculate the misattribution-corrected UA size values 602 substantially reduces or eliminates the effects that misattributed impressions logged by the database proprietor 116 have on the DT-corrected UA size values 606.

In the illustrated example of FIG. 6, the example impressions corrector 238 of FIG. 2 applies the IA factors 502 to the DT-corrected impression counts 608 to determine the misattribution-corrected impression counts 604. That is, the example impressions corrector 238 increases a DT-corrected impression count 608 for a demographic group based on a corresponding IA factor 502 for the same demographic group to calculate a corresponding misattribution-corrected impressions count 604. In particular, the example impressions corrector 238 multiples an IA factor 502 for a demographic group by the total DP DT-corrected impressions count 612 summed across all of the demographic groups to determine a number of adjustment impressions by which to adjust the DP DT-corrected impressions count 608 for the same demographic group corresponding to the selected IA factor 502 (e.g., (adjustment impressions)=(IA factor)×(total cross-demographic DP DT-corrected impressions)). The example impressions corrector 238 then adds the calculated adjustment impressions to the corresponding DP DT-corrected impressions count 608 for the same demographic group to determine a corresponding misattribution-corrected impressions count 604 (e.g., (misattribution-corrected impressions count)=(DP DT-corrected impressions count 608)+(adjustment impressions)).

For example, to determine the misattribution-corrected impressions 604 corresponding to the F<50 demographic group, the example impressions corrector 238 of FIG. 2 multiples the IA factor 502 of 11.11% for the F<50 demographic group by the total DP DT-corrected impressions count 612 of 710,000 to calculate the adjustment impressions of 78,888. The example impressions corrector 238 then adds the 78,888 adjustment impressions to the corresponding DP DT-corrected impressions count 608 of 210,000 for the F<50 demographic group to calculate the misattribution-corrected impressions count 604 of 288,889 for the F<50 demographic group.

To determine the misattribution-corrected impressions 604 for the M<50 demographic group, the example impressions corrector 238 of FIG. 2 multiples the IA factor 502 of −11.11% for the M<50 demographic group by the total DP DT-corrected impressions count 612 of 710,000 to calculate the adjustment impressions of −78,888. The example impressions corrector 238 then adds the −78,888 adjustment impressions to (or subtracts 78,888 from) the corresponding DP DT-corrected impressions count 608 of 165,000 for the M<50 demographic group to calculate the misattribution-corrected impressions count 604 of 86,111 for the M<50 demographic group.

An alternative technique to determine the misattribution-corrected unique audience sizes involves using impressions frequency values as described in connection with FIG. 7. FIG. 7 illustrates an example table 700 with misattribution-corrected unique audience values 702 and misattribution-corrected impression counts 604 determined based on the IA factors 502 of FIG. 5 and impression frequencies 706 for different demographic groups. As used herein, impressions frequency is a number of total impressions (e.g., a DP DT-corrected impression count 608 of FIG. 6) divided by a quantity of unique audience members (e.g., a DT-corrected UA size value 606 of FIG. 6) (e.g., frequency=impressions count/UA). For example, for the F<50 demographic group, the database proprietor impressions frequency 706 is 3.33, which is calculated by dividing 210,000 DP DT-corrected impressions by 63,000 DP DT-corrected UA. In the illustrated example of FIG. 7, after the example impressions corrector 238 determines the misattributions-corrected impressions 604 based on the IA factors 502 as described above in connection with FIG. 6, the example unique audience corrector 236 divides the misattribution-corrected impressions 604 of 288,889 for the F<50 demographic group by the DP frequency of 3.33 (for the F<50 demographic group) to calculate a misattribution-corrected UA size 702 of 86,667. The frequency-based approach to determining misattribution-corrected impressions 704 preserves the impressions frequencies for the demographic groups.

As shown in FIGS. 6 and 7, the misattribution-corrected UA sizes 602 of FIG. 6 are different from the misattribution-corrected UA sizes 702 of FIG. 7. In determining whether to use the AA factor approach described above in connection with FIG. 6 or the impressions frequency approach described in connection with FIG. 7 to determine misattribution-corrected UA sizes, both approaches can be applied over multiple iterations on test data for which true UA sizes are known. The approach that produces the most accurate misattribution-corrected UA sizes relative to the true UA sizes can then be selected for use on real impression data. Alternatively, the impression frequency approach may be selected if a party wishes to preserve impression frequency even if the accuracies of resulting misattribution-corrected UA sizes are not optimal.

An example advantage of example misattribution adjustment techniques disclosed herein is that the total DP DT-corrected impressions count 612 (e.g., 710,000 impressions in FIGS. 6 and 7) remains the same after correcting the data for misattribution errors. That is, impressions are not changed, but are instead redistributed. For example, as shown in FIGS. 6 and 7, a total misattribution-corrected impressions count 614 across all demographic groups is 710,000, which is equal to the DP DT-corrected impressions count 612 of 710,000.

Figure 8:
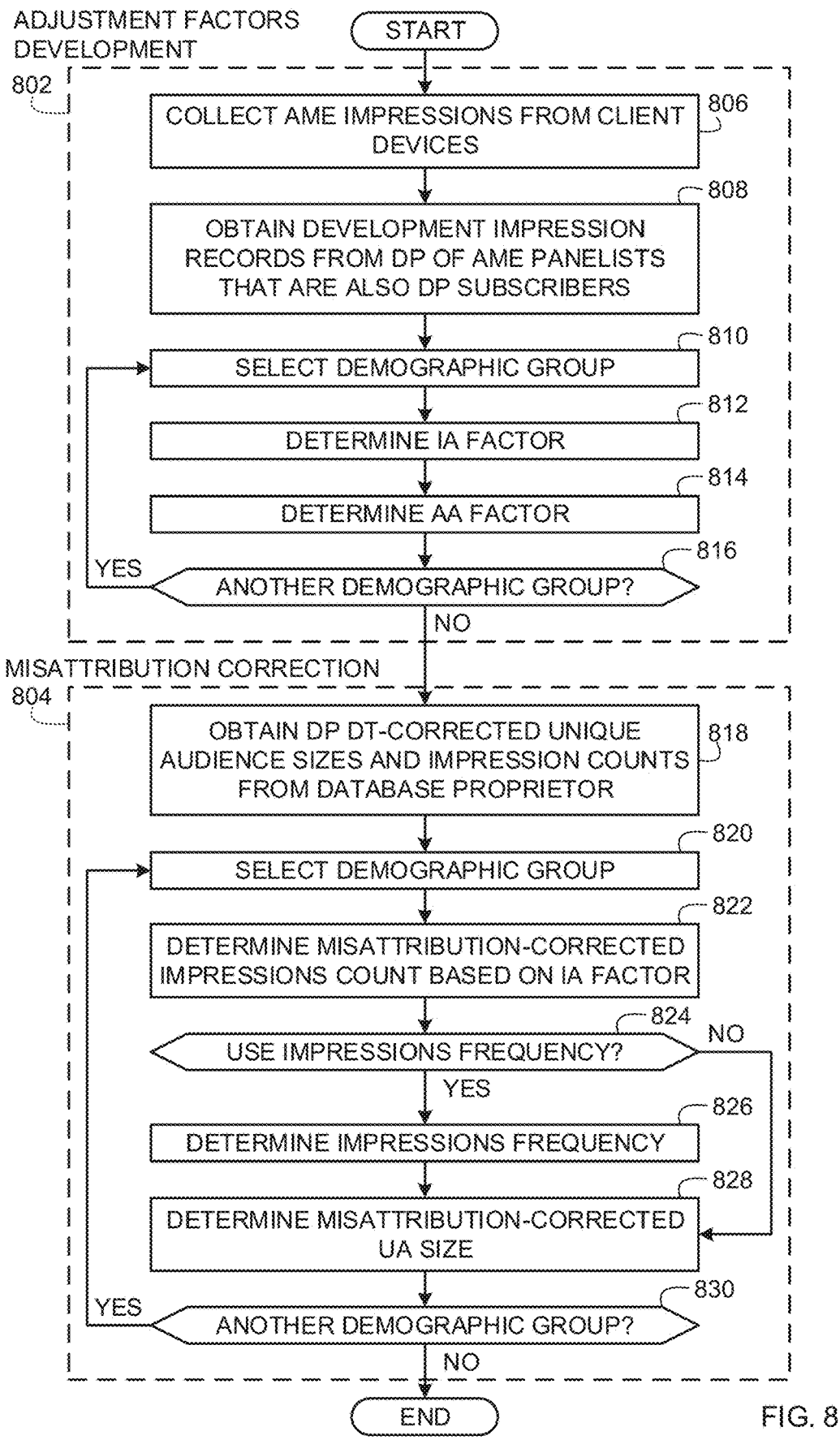
FIG. 8 is a flow diagram representative of example machine readable instructions that may be executed to implement the misattribution corrector of FIG. 2 to determine misattribution-corrected unique audience sizes and misattribution-corrected impression counts.

FIG. 8 is a flow diagram representative of machine readable instructions that may be executed to implement the misattribution corrector 202 of FIG. 2 to determine the AA factors 402 of FIGS. 4 and 6, the IA factors 502 of FIGS. 5, 6, and 7, the misattribution-corrected unique audience sizes 602 of FIG. 6, the misattribution-corrected unique audience sizes 702 of FIG. 7, and the misattribution-corrected impression counts 604 of FIGS. 6 and 7. In this example, the machine readable instructions comprise one or more programs for execution by a processor such as the processor 912 shown in the example processor platform 900 discussed below in connection with FIG. 9. The program(s) may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program(s) is/are described with reference to the flowchart illustrated in FIG. 8, many other methods of implementing the example misattribution corrector 202 may alternatively be used. For example, the order of execution of the blocks may be changed, and/or some of the blocks described may be changed, eliminated, or combined.

As mentioned above, the example process(es) of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process(es) of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example flow diagram of FIG. 8 is shown as two phases including an example adjustment factors development phase 802 and an example misattribution correction phase 804. During the adjustment factors development phase 802, the misattribution corrector 202 (FIG. 2) determines the AA factors 402 (FIGS. 4 and 6) and the IA factors 502 (FIGS. 5 and 6) for different demographic groups based on development or test impressions such as the impressions shown in table 300 of FIG. 3. During the misattribution correction phase 804, the misattribution corrector 202 corrects aggregate impression data (e.g., unique audience measures and total impression counts) generated based on impressions collected by the database proprietor 116 (and/or one or more other database proprietors). For example, the misattribution corrector 202 uses the AA factors 402 and/or the IA factors 502 to determine the misattribution corrected UA size values 602 of FIG. 6, the misattribution-corrected UA size values 702 of FIG. 7, and/or the misattribution-corrected impression counts 604 of FIGS. 6 and 7 for different demographic groups. In some examples, the misattribution correction phase 804 may begin immediately after the adjustment factors development phase 802. In other examples, the misattribution correction phase 804 may begin after a significant amount of time (e.g., hours, days, weeks, etc.) has passed following the completion of the adjustment factors development phase 802. In some examples, the adjustment factors development phase 802 and the misattribution correction phase 804 may be implemented as part of a same program. In other examples, the adjustment factors development phase 802 and the misattribution correction phase 804 may be implemented as two separate programs.

The example adjustment factors development phase 802 of FIG. 8 begins at block 806 at which the AME impressions collector 218 collects impressions from the client device 102. For example, the AME impressions collector 218 collects impressions using the techniques described above in connection with FIG. 2. The DP impressions collector 230 obtains development impression records from the database proprietor 116 that correspond to AME panelists that are also subscribers of the database proprietor 116 (block 808). The misattribution corrector 202 selects a demographic group (block 810). For example, the misattribution corrector 202 selects one of the demographic groups of FIGS. 4-7. The example impressions adjustment factor determiner 234 (FIG. 2) determines an IA factor 502 for the selected demographic group (block 812). For example, the impressions adjustment factor determiner 234 determines the IA factor 502 using Equation 2 above and/or the technique described above in connection with FIG. 5.

The example unique audience adjustment factor determiner 232 (FIG. 2) determines an AA factor 402 for the selected demographic group (block 814). For example, the unique audience adjustment factor determiner 232 determines the AA factor 402 using Equation 1 above and/or the technique described above in connection with FIG. 4. The misattribution corrector 202 determines whether there is another demographic group for which to determine adjustment factors (block 816). If there is another demographic group, control returns to block 810. If there is not another demographic group, the adjustment factors development phase 802 ends. In the illustrated example, after the adjustment factors development phase 802 ends, the misattribution correction phase 804 begins based on the IA factors 502 and the AA factors 402 determined during the adjustment factors development phase 802. In some examples, the adjustment factors development phase 802 is repeated from time to time (e.g., after a number of days, weeks, months, etc.) to update the IA factors 502 and/or the AA factors 402. For example, the ability of the database proprietor 116 to identify subscribers may change (e.g., increased or decreased accuracy) from time to time. As such, to increase the likelihood that the IA factors 502 and the AA factors 402 reflect such changes, the adjustment factors development phase 802 can be repeated from time to time.

In the misattribution correction phase 804, the DP impressions collector 230 obtains the DP DT-corrected unique audience sizes 606 (FIG. 6) and DP DT-corrected impression counts 608 (FIG. 6) from the database proprietor 116 (block 818). The misattribution corrector 202 selects a demographic group (block 820). For example, the misattribution corrector 202 selects one of the demographic groups of FIGS. 4-7. The example impressions corrector 238 (FIG. 2) determines a misattribution-corrected impressions count 604 (FIGS. 6 and 7) based on the IA factor 502 for the selected demographic group (block 822). For example, the impressions corrector 238 can determine the misattribution-corrected impressions count 604 as described above in connection with FIG. 6.

The misattribution corrector 202 determines whether to use impressions frequency to determine a misattribution-corrected unique audience size (block 824). For example, the misattribution corrector 202 may check a configuration setting in a file, a program, and/or a hardware setting indicating whether to determine a misattribution-corrected unique audience size based on an impressions frequency 706 (FIG. 7). If the misattribution corrector 202 determines that it should determine a misattribution-corrected unique audience size based on an impressions frequency 706, the misattribution corrector 202 determines an impressions frequency 706 for the selected demographic profile (block 826). For example, the misattribution corrector 202 may determine the impressions frequency 706 for the selected demographic profile as described above in connection with FIG. 7. If the misattribution corrector 202 determines that it should not use an impressions frequency 706 to determine a misattribution-corrected unique audience size, control advances to block 828 without determining an impressions frequency 706. In some examples, the impressions frequency 706 is determined by the database proprietor 116 and provided by the database proprietor 116 to the misattribution corrector 202 via the DP impressions collector 230. In such examples, the misattribution corrector 202 does not need to determine the impressions frequency 706.

At block 828, the example unique audience corrector 236 (FIG. 2) determines the misattribution-corrected UA size for the selected demographic group (block 828). For example, if the misattribution corrector 202 determined at block 824 that the impressions frequency 706 is to be used to determine the misattribution-corrected UA size 702 (FIG. 7) for the selected demographic group, the unique audience corrector 236 determines the misattribution-corrected UA size 702 based on the impressions frequency 706 of block 826 as described above in connection with FIG. 7. Alternatively at block 828, if the misattribution corrector 202 determined at block 824 that the impressions frequency 706 is not to be used to determine the misattribution-corrected UA size 602 (FIG. 6) for the selected demographic group, the unique audience corrector 236 determines the misattribution-corrected UA size 602 based on the AA factor 402 (FIG. 4) of the selected demographic group as described above in connection with FIG. 6.

The misattribution corrector 202 then determines whether there is another demographic group for which misattribution-adjusted impression counts or misattribution-adjusted UA sizes are to be determined (block 830). If there is another demographic group, control returns to block 820. Otherwise, the example program of FIG. 8 ends.

Figure 9:
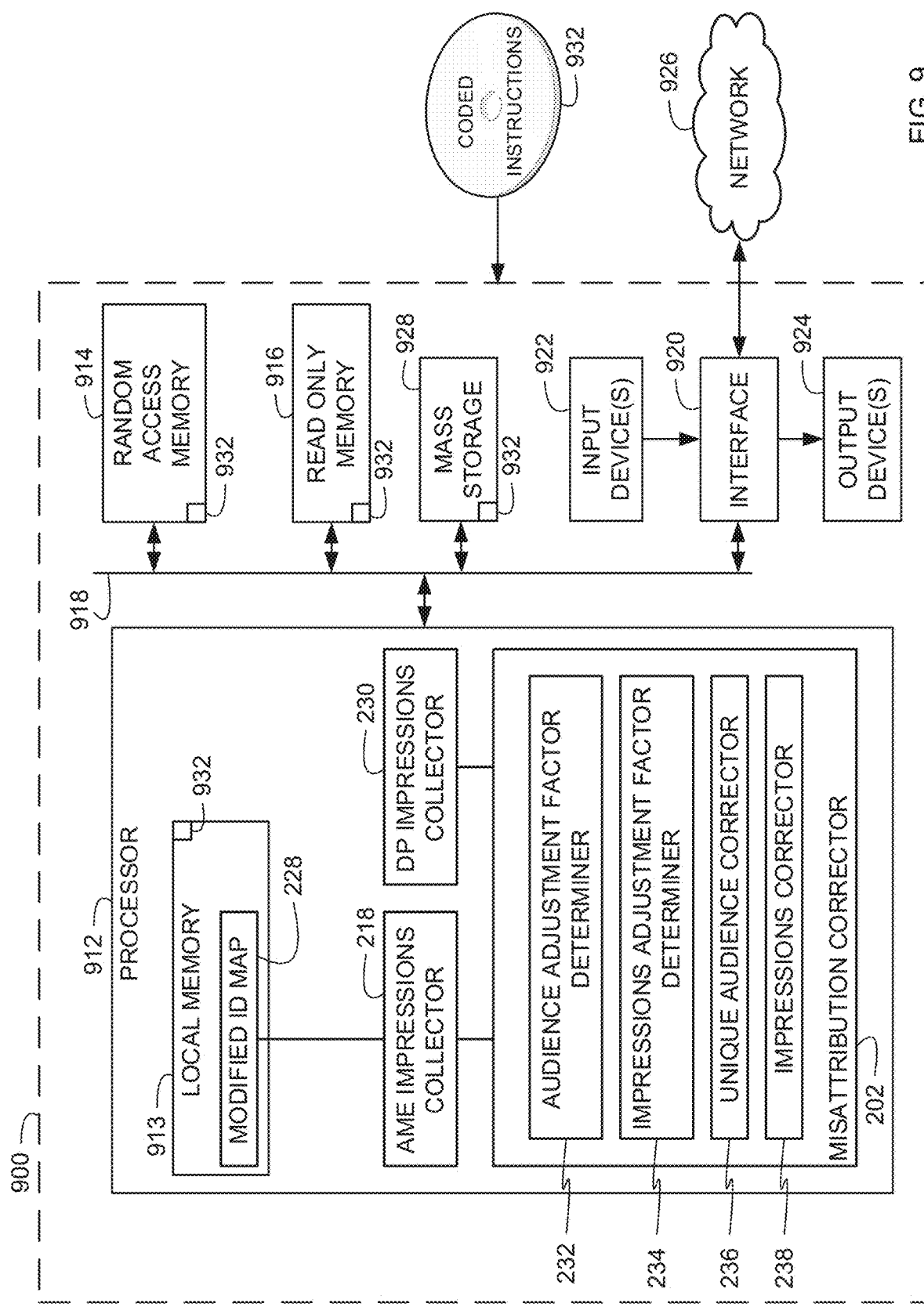
FIG. 9 illustrates an example processor system structured to execute the example instructions of FIG. 8 to implement the example AME of FIGS. 1 and/or 2.

FIG. 9 is a block diagram of an example processor platform 900 capable of executing the instructions of FIG. 9 to implement the misattribution corrector 202 of FIG. 2. The processor platform 900 can be, for example, a server, a personal computer, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

In the illustrated example, the processor 912 implements the example misattribution corrector 202, the example AME impressions collector 218, the example DP impressions collector 230, the example audience adjustment factor determiner 232, the example impressions adjustment factor determiner 234, the example unique audience corrector 236, and/or the example impressions corrector 238 described above in connection with FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 914, 916 is controlled by a memory controller.

In the illustrated example, the local memory 913 stores the example modified ID map 228 described above in connection with FIG. 2. In other examples any one or more of the local memory 913, the random access memory 914, the read only memory 916, and/or a mass storage device 928 may store the example modified ID map 228.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 include the machine readable instructions of FIG. 8 and may be stored in the mass storage device 928, in the volatile memory 914, in the non-volatile memory 916, and/or on a removable tangible computer readable storage medium such as a CD or DVD.

From the foregoing, it will be appreciate that methods, apparatus and articles of manufacture have been disclosed which enhance the operations of a computer to improve the accuracy of impression-based data such as unique audience and impression counts so that computers and processing systems therein can be relied upon to produce audience analysis information with higher accuracies. In some examples, computer operations can be made more efficient based on the above equations and techniques for determining IA factors, AA factors, misattribution-corrected unique audience sizes, and misattribution-corrected impression counts. That is, through the use of these processes, computers can operate more efficiently by relatively quickly determining parameters and applying those parameters through the above disclosed techniques to determine the misattribution-corrected data. For example, using example processes disclosed herein, a computer can more efficiently and effectively identify misattribution errors (e.g., the misattribution error 308 of FIG. 3) in development or test data logged by the AME 114 and the database proprietor 116 without using large amounts of network communication bandwidth (e.g., conserving network communication bandwidth) and without using large amounts of computer processing resources (e.g., conserving processing resources) to communicate with individual online users to request survey responses about their online media access habits and without needing to rely on such survey responses from such online users. Survey responses from online users can be inaccurate due to inabilities or unwillingness of users to recollect online media accesses. Survey responses can also be incomplete, which could require additional processor resources to identify and supplement incomplete survey responses. As such, examples disclosed herein more efficiently and effectively determine misattribution-corrected data. Such misattribution-corrected data is useful in subsequent processing for identifying exposure performances of different media so that media providers, advertisers, product manufacturers, and/or service providers can make more informed decisions on how to spend advertising dollars and/or media production and distribution dollars.

Furthermore, example methods, apparatus, and/or articles of manufacture disclosed herein identify and overcome inaccuracies in impressions and/or aggregate impression-based data provided by database proprietors. For example, example methods, apparatus, and/or articles of manufacture disclosed herein overcome the technical problem of counting impressions and determining unique audiences of media on media devices that are shared by multiple people. Example methods, apparatus, and/or articles of manufacture disclosed herein solve this problem without forcing such media devices to be used by only a single person and without forcing people to always login to their subscriber accounts of database proprietors. By not forcing logins into database proprietor accounts, examples disclosed herein do not force additional network communications to be employed, thus, reducing network traffic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
impression collector circuitry to:
receive, at a first internet domain corresponding to an audience measurement entity and via a first network communication, a first request from a client computing device that is shared by multiple users, the first request to be indicative of access to media at the client computing device, the first request occurring after an access to the media via the client computing device by a second user, the access to the media by the second user being after a login to a second internet domain at a server of a database proprietor by a first user via the client computing device; and
send, from the first internet domain and via a second network communication, a response to the client computing device, the response to instruct the client computing device to send a second request to the second internet domain at the server of the database proprietor, the second request to be indicative of the access to the media at the client computing device;
log, in a database, first impressions based on the first request from the client computing device;
access second impressions at the server of the database proprietor based on the response to the client computing device and the second request to the second internet domain;
audience adjustment factor determiner circuitry to:
determine an audience adjustment factor value for a demographic group based on (i) a first unique audience size, the first unique audience size to correspond to a count of first impressions reported by the client computing device to the first internet domain corresponding to the audience measurement entity and (ii) a second unique audience size, the second unique audience size to correspond to a count of second impressions reported by the client computing device to the second internet domain at the server of the database proprietor, the count of the first impressions and the count of the second impressions corresponding to the media accessed on the client computing device, the audience adjustment factor value including a ratio of the second unique audience size and the first unique audience size; and
unique audience corrector circuitry to:
correct a misattribution error generated by the server of the database proprietor based on the client computing device being shared by the multiple users;
determine a misattribution-corrected unique audience size for the demographic group based on the audience adjustment factor value being applied to the second unique audience size determined at the second internet domain for the demographic group, the misattribution-corrected unique audience size to correct for the misattribution error in the second unique audience size, the misattribution error generated by the server of the database proprietor based on third impressions misattributed by the server of the database proprietor at the second internet domain to the demographic group when the third impressions correspond to another demographic group.

2. The apparatus as defined in claim 1, wherein the audience adjustment factor determiner circuitry is to determine the audience adjustment factor value by dividing a third unique audience size corresponding to the count of the first impressions by a fourth unique audience size corresponding to the count of the second impressions.

3. The apparatus as defined in claim 1, wherein the unique audience corrector circuitry is to determine the misattribution-corrected unique audience size for the demographic group by dividing the second unique audience size by the audience adjustment factor value.

4. The apparatus as defined in claim 1, wherein the first impressions are reported by the client computing device to an audience measurement entity at the first internet domain that does not provide the media to the client computing device, and a user of the client computing device is a panel member of the audience measurement entity.

5. The apparatus as defined in claim 1, wherein the second impressions are reported by the client computing device to a social network service at the second internet domain to which a user of the client computing device is subscribed.

6. The apparatus as defined in claim 1, wherein the audience adjustment factor value is to correct unique audience size values having inaccuracies due to fourth impressions incorrectly attributed to demographic data not corresponding to persons corresponding to the fourth impressions.

7. The apparatus as defined in claim 1, wherein the misattribution error in the second unique audience size is based on the server at the second internet domain incorrectly identifying a user of the client computing device as belonging to the demographic group when the user belongs to the another demographic group, the unique audience corrector circuitry to determine the misattribution-corrected unique audience size by dividing the second unique audience size by the audience adjustment factor value.

8. The apparatus as defined in claim 1, wherein the unique audience corrector circuitry is to determine the misattribution-corrected unique audience size based on the audience adjustment factor value without communicating with individual online users about online media access habits and without using survey responses from the individual online users to determine the misattribution error.

9. The apparatus as defined in claim 8, wherein by determining the misattribution-corrected unique audience size, the unique audience corrector circuitry conserves network communication bandwidth by not communicating with the individual online users about the online media access habits and by not requesting the survey responses from the individual online users to determine the misattribution error.

10. The apparatus as defined in claim 8, wherein by determining the misattribution-corrected unique audience size, the unique audience corrector circuitry conserves computer processing resources by not communicating with the individual online users about the online media access habits and by not requesting the survey responses from the individual online users to determine the misattribution error.

11. A non-transitory computer readable medium comprising instructions that, when executed, cause programmable circuitry to at least:
receive, at a first internet domain corresponding to an audience measurement entity and via a first network communication, a first request from a client computing device that is shared by multiple users, the first request to be indicative of access to media at the client computing device, the first request occurring after an access to the media via the client computing device by a second user, the access to the media by the second user being after a login to a second internet domain at a server of a database proprietor by a first user via the client computing device;

send, from the first internet domain and via a second network communication, a response to the client computing device, the response to instruct the client computing device to send a second request to the second internet domain at the server of the database proprietor, the second request to be indicative of the access to the media at the client computing device;

log, in a database, first impressions based on the first request from the client computing device;

access second impressions at the server of the database proprietor based on the response to the client computing device and the second request to the second internet domain;

determine an audience adjustment factor value for a demographic group based on (i) a first unique audience size, the first unique audience size to correspond to a count of first impressions reported by the client computing device to the first internet domain corresponding to the audience measurement entity and (ii) a second unique audience size, the second unique audience size to correspond to a count of second impressions reported by the client computing device to the second internet domain at the server of the database proprietor, the count of the first impressions and the count of the second impressions corresponding to the media accessed on the client computing device, the audience adjustment factor value including a ratio of the second unique audience size and the first unique audience size; and correct a misattribution error generated by the server of the database proprietor based on the client computing device being shared by the multiple users by determining a misattribution-corrected unique audience size for the demographic group based on the audience adjustment factor value being applied to the second unique audience size determined at the second internet domain for the demographic group, the misattribution-corrected unique audience size to correct for the misattribution error in the second unique audience size, the misattribution error generated by the server of the database proprietor based on third impressions misattributed by the server of the database proprietor at the second internet domain to the demographic group when the third impressions correspond to another demographic group.

12. The non-transitory computer readable medium as defined in claim 11, wherein the instructions are further to cause the programmable circuitry to determine the audience adjustment factor value by dividing a third unique audience size corresponding to the count of the first impressions by a fourth unique audience size corresponding to the count of the second impressions.

13. The non-transitory computer readable medium as defined in claim 11, wherein the instructions are further to cause the programmable circuitry to determine the misattribution-corrected unique audience size for the demographic group by dividing the second unique audience size by the audience adjustment factor value.

14. The non-transitory computer readable medium as defined in claim 11, wherein the count of the first impressions are reported by the client computing device to an audience measurement entity at the first internet domain that does not provide the media to the client computing device, and a user of the client computing device is a panel member of the audience measurement entity.

15. The non-transitory computer readable medium as defined in claim 11, wherein the count of the second impressions are reported by the client computing device to a social network service at the second internet domain to which a user of the client computing device is subscribed.

16. The non-transitory computer readable medium as defined in claim 11, wherein the audience adjustment factor value is to correct unique audience size values having inaccuracies due to fourth impressions incorrectly attributed to demographic data not corresponding to persons corresponding to the fourth impressions.

17. The non-transitory computer readable medium as defined in claim 11, wherein the misattribution error in the second unique audience size is based on an entity at the second internet domain incorrectly identifying a user of the client computing device as belonging to the demographic group when the user belongs to the another demographic group, the misattribution-corrected unique audience size being different than the second unique audience size based on dividing the second unique audience size by the audience adjustment factor value.

18. The non-transitory computer readable medium as defined in claim 11, wherein the instructions further cause the programmable circuitry to determine the misattribution-corrected unique audience size based on the audience adjustment factor value without communicating with individual online users about online media access habits and without using survey responses from the individual online users to determine the misattribution error in the second unique audience size.

19. The non-transitory computer readable medium as defined in claim 18, wherein the instructions further cause the programmable circuitry to conserve network communication bandwidth by not communicating with the individual online users about the online media access habits and by not requesting the survey responses from the individual online users to determine the misattribution error in the second unique audience size.

20. The A non-transitory computer readable medium as defined in claim 18, wherein the instructions further cause the programmable circuitry to conserve computer processing resources by not communicating with the individual online users about the online media access habits and by not requesting the survey responses from the individual online users to determine the misattribution error in the second unique audience size.

* * * * *